(12) United States Patent
Karampatsis et al.

(10) Patent No.: US 12,219,353 B2
(45) Date of Patent: Feb. 4, 2025

(54) ACCESSING A MOBILE COMMUNICATION NETWORK USING A USER IDENTIFIER

(71) Applicant: Lenovo (Singapore) PTE. LTD., New Tech Park (SG)

(72) Inventors: Dimitrios Karampatsis, Ruislip (GB); Apostolis Salkintzis, Athens (GR); Genadi Velev, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 421 days.

(21) Appl. No.: 17/764,507

(22) PCT Filed: Oct. 9, 2019

(86) PCT No.: PCT/EP2019/077273
§ 371 (c)(1),
(2) Date: Mar. 28, 2022

(87) PCT Pub. No.: WO2021/069067
PCT Pub. Date: Apr. 15, 2021

(65) Prior Publication Data
US 2022/0345887 A1    Oct. 27, 2022

(51) Int. Cl.
*H04W 12/069* (2021.01)
*H04L 67/306* (2022.01)
(Continued)

(52) U.S. Cl.
CPC ......... *H04W 12/069* (2021.01); *H04L 67/306* (2013.01); *H04W 8/18* (2013.01); *H04W 12/08* (2013.01)

(58) Field of Classification Search
CPC .............. H04L 63/083; H04L 63/102; H04L 2101/395; H04L 61/3015; H04L 61/4588;
(Continued)

(56) References Cited

U.S. PATENT DOCUMENTS

| 8,948,750 | B1 * | 2/2015 | Carames | ............... | H04W 8/12 |
| | | | | | 455/433 |
| 2009/0305674 | A1 * | 12/2009 | Teittinen | ............... | H04W 8/12 |
| | | | | | 455/411 |

(Continued)

OTHER PUBLICATIONS

PCT/IB2019/077273, "Notification of Transmittal of the International search Report and the Written Opinion of the International Searching Authority, or the Declaration", International Searching Authority—PCT, Nov. 22, 2019, pp. 1-38.
(Continued)

*Primary Examiner* — Matthew C Sams
(74) *Attorney, Agent, or Firm* — Kunzler Bean & Adamson

(57) ABSTRACT

Apparatuses, methods, and systems are disclosed for accessing a mobile communication network using a User Identifier. One apparatus (600) includes a processor (605) that establishes (805) a first connection with a remote unit and a transceiver (625) that receives (810) a first request via the first connection to create a User Profile. The processor (605) determines (815) whether the User Profile is to be linked with a third-party account and, if so, creates (820) the User Profile based on information in the third-party account and, if not, creates (825) the User Profile based on information received from the first device. The transceiver (625) sends (830) to the remote unit via the first connection a Device User Profile and sends (835) a second request to the mobile communication network to store the User Profile.

20 Claims, 16 Drawing Sheets

(51) Int. Cl.
*H04W 8/18* (2009.01)
*H04W 12/08* (2021.01)

(58) Field of Classification Search
CPC ............ H04L 63/0876; H04L 63/0884; H04L 63/107; H04L 63/1425; H04L 65/1016; H04L 65/1073; H04W 12/06; H04W 12/72; H04W 8/12; H04W 8/24; H04W 12/08; H04W 12/71; H04W 4/50; H04W 60/04; H04W 76/12; H04W 8/18; H04W 8/265; G06F 21/6218; G06F 21/64; H04M 7/0078

See application file for complete search history.

(56) References Cited

U.S. PATENT DOCUMENTS

| | | | | |
|---|---|---|---|---|
| 2013/0086670 | A1* | 4/2013 | Vangpat | H04L 63/0815 726/8 |
| 2018/0006998 | A1* | 1/2018 | Chatterjee | H04L 61/3015 |
| 2020/0351266 | A1* | 11/2020 | Cannon, Jr. | G06F 21/6218 |
| 2021/0029127 | A1* | 1/2021 | Stubblefield | H04W 12/71 |
| 2021/0320914 | A1* | 10/2021 | Pillai | H04L 63/0407 |

OTHER PUBLICATIONS

Motorola Mobility, Lenovo, "Af influence on network slice selection for IMS services", SA WG2 Meeting #126 S2-182980, Feb. 26-Mar. 2, 2018, pp. 1-7.

Motorola Mobility, Lenovo, "Application Function influence on slice selection", SA WG2 Meeting #122 S2-174262, Jun. 26-Jun. 30, 2017, pp. 1-5.

3GPP, "3rd Generation Partnership Project; Technical Specification Group Services and System Aspects; Policy and Charging Control Framework for the 5G System (5GS); Stage 2 (Release 16)", 3GPP TS 23.503 V16.2.0, Sep. 2019, pp. 1-104.

3GPP, "3rd Generation Partnership Project; Technical Specification Group Services and System Aspects; Procedures for the 5G System (5GS); Stage 2 (Release 16)", 3GPP TS 23.502 V16.2.0, Sep. 2019, pp. 1-525.

3GPP, "3rd Generation Partnership Project; Technical Specification Group Services and System Aspects; Service aspects; Service principles (Release 17)", 3GPP TS 22.101 V17.0.0, Sep. 2019, pp. 1-103.

3GPP, "3rd Generation Partnership Project; Technical Specification Group Services and System Aspects; Study on user centric identifiers and authentication (Release 16)", 3GPP TR 22.904 V16.1.0, Sep. 2018, pp. 1-20.

3GPP, "3rd Generation Partnership Project; Technical Specification Group Services and System Aspects; System Architecture for the 5G System (5GS); Stage 2 (Release 16)", 3GPP TS 23.501 V16.2.0, Sep. 2019, pp. 1-391.

Motorola Mobility et al. "Update to solution 8—Routing media traffic via different 5G network slices", SA WG2 Meeting #127 S2-1844457, Apr. 16-Apr. 20, 2018, pp. 1-12.

* cited by examiner

| Data Set | Data Subset | Data Key | Data Sub Key |
|---|---|---|---|
| Subscription Data (Refer to TS 23.502, clause 5.2.3.3.1) | Access and Mobility Subscription data 305 | SUPI | - |
| | Session Management Subscription Data 310 | SUPI | S-NSSAI |
| | | | DNN |
| Policy Data (Refer to TS 23.502, clause 5.2.12.1) | PDU Session policy control data 315 (Refer to TS 23.503, clause 6.2.1.3) | SUPI | S-NSSAI |
| | | | DNN |

UDR Data Sets 300

---

Access and Mobility Subscription Data 305

List of GPSIs
List of internal group identifiers
List of restricted RAT types ("NR," "EUTRA," "WLAN," "VIRTUAL," "NBIOT")
List of forbidden areas
List of restricted core network types ("5GC," "EPC")
List of subscribed DNNs
Service Area restriction
Subscribed UE AMBR
NSSAI (default S-NSSAIs, non-default S-NSSAIs)
...
List of User Profiles:
    User Profile ID-1:
        List of User Identifiers
        List of Allowed Devices
        NSSAI
        DNNs
    User Profile ID-2:
        List of User Identifiers
        List of Allowed Devices
        NSSAI
        DNNs
...

FIG. 3A

Session Management Subscription Data 310

S-NSSAI-1:
  DNN-a, DnnConfiguration (PDU Session types, SSC Modes, EPS IWK Ind, 5G QoS Profile, Session AMBR, static IP, UP Security, ...)
  DNN-b, DnnConfiguration (...)
  List of internal groups Ids
  Trace data
S-NSSAI-2:
  DNN-d, DnnConfiguration (PDU Session types, SSC Modes, EPS IWK Ind, 5G QoS Profile, Session AMBR, static IP, UP Security, ...)
  DNN-e, DnnConfiguration (...)
  List of internal groups Ids
  Trace data
...
User Profile ID-1:
  S-NSSAI-3:
    DNN-w, DnnConfiguration (PDU Session types, SSC Modes, EPS IWK Ind, 5G QoS Profile, Session AMBR, static IP, UP Security, ...)
    DNN-x, DnnConfiguration (...)
User Profile ID-2:
  S-NSSAI-4:
    DNN-y, DnnConfiguration (PDU Session types, SSC Modes, EPS IWK Ind, 5G QoS Profile, Session AMBR, static IP, UP Security, ...)
    DNN-z, DnnConfiguration (...)
...

PDU Session Policy Control Data 315

S-NSSAI-1:
  DNN-a, SmPolicyDnnData (allowed services, max GBR UL, max GBR DL, IPv4 index, ...)
  DNN-b, SmPolicyDnnData (...)
S-NSSAI-2:
  DNN-d, SmPolicyDnnData (allowed services, max GBR UL, max GBR DL, IPv4 index, ...)
  DNN-e, SmPolicyDnnData (...)
...
User Profile ID-1:
  S-NSSAI-3:
    DNN-w, SmPolicyDnnData (allowed services, max GBR UL, max GBR DL, IPv4 index, ...)
    DNN-x, SmPolicyDnnData (...)
User Profile ID-2:
  S-NSSAI-4:
    DNN-y, SmPolicyDnnData (allowed services, max GBR UL, max GBR DL, IPv4 index, ...)
    DNN-z, SmPolicyDnnData (...)
...

ACCESSING A MOBILE COMMUNICATION NETWORK USING A USER IDENTIFIER

FIELD

The subject matter disclosed herein relates generally to wireless communications and more particularly relates to accessing a mobile communication network using a User Identifier.

BACKGROUND

The following abbreviations and acronyms are herewith defined, at least some of which are referred to within the following description.

Third Generation Partnership Project ("3GPP"), Fifth-Generation Core ("5GC"), Fifth-Generation QoS Indicator ("5QI"), Access and Mobility Management Function ("AMF"), Access Network Performance ("ANP"), Access Point Name ("APN"), Access Stratum ("AS"), Access Traffic Steering, Switching and Splitting ("ATSSS"), Allocation/Retention Policy ("ARP"), Application Programing Interface ("API"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Differentiated Services Code Point ("DSCP"), Downlink Control Information ("DCI"), Downlink ("DL"), Enhanced Clear Channel Assessment ("eCCA"), Enhanced Mobile Broadband ("eMBB"), Encapsulating Security Payload ("ESP"), Evolved Node-B ("eNB"), Evolved Packet Core ("EPC"), Evolved UMTS Terrestrial Radio Access Network ("E-UTRAN"), European Telecommunications Standards Institute ("ETSI"), Echo Acknowledgement Indicator ("EAI"), Request Indicator ("ERI," ERI-d refers to an ERI associated with a dummy payload and ERI-v refers to an ERI associated with a valid payload), Fixed Access Gateway Function ("FAGF"), Fixed Network Residential Gateway ("FN-RG"), Frame Based Equipment ("FBE"), Frequency Division Duplex ("FDD"), Frequency Division Multiple Access ("FDMA"), Generic Routing Encapsulation ("GRE"), Globally Unique Temporary UE Identity ("GUTI"), General Packet Radio Service ("GPRS"), GPRS Tunneling Protocol ("GTP," GTP-C refers to control signal tunneling while GTP-U refers to user data tunneling), Hybrid Automatic Repeat Request ("HARQ"), Home Subscriber Server ("HSS"), Internet-of-Things ("IoT"), IP Multimedia Subsystem ("IMS," aka "IP Multimedia Core Network Subsystem"), Internet Protocol ("IP"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Public Land Mobile Network ("PLMN"), Quality of Service ("QoS"), QoS Class Identifier ("QCI"), Quadrature Phase Shift Keying ("QPSK"), Registration Area ("RA"), Radio Access Network ("RAN"), Radio Access Technology ("RAT"), Radio Resource Control ("RRC"), Receive ("RX"), Reflective QoS Indicator ("RQI"), Single Network Slice Selection Assistance Information ("S-NSSAI"), Scheduling Request ("SR"), Secure User Plane Location ("SUPL"), Serving Gateway ("SGW"), Session Management Function ("SMF"), Stream Control Transmission Protocol ("SCTP"), System Information Block ("SIB"), Tracking Area ("TA"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmit ("TX"), Trusted WLAN Interworking Function ("TWIF"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), User Datagram Protocol ("UDP"), UE Route Selection Policy ("URSP"), Wireless Local Area Network ("WLAN"), Wireless Local Area Network Selection Policy ("WLANSP"), and Worldwide Interoperability for Microwave Access ("WiMAX").

Currently, when a mobile device connects to a mobile communication network, the network identifies a subscription associated with the USIM in the device and is configured to offer mobile services based on the provisioned data in this subscription.

BRIEF SUMMARY

Methods for accessing a mobile communication network using a User Identifier are disclosed. Apparatuses and systems also perform the functions of the methods.

One method for accessing a mobile communication network using a User Identifier includes receiving from a first network function (i.e., a UIMF) configuration data for a plurality of device user profiles, each device user profile in the configuration data containing at least one of: a user identifier, associated application information, and authentication credentials. The method includes determining the need to establish a data connection (e.g., PDU session) with a mobile communication network and selecting a first device user profile of the plurality of device user profiles to use with the data connection. The method includes sending a request to establish the data connection, the request containing information based on the first device user profile including a user identifier for authenticating the request.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3A is a block diagram illustrating UDR data sets and data subsets for accessing a mobile communication network using a User Identifier;

FIG. 3B is a continuation of the UDR data sets and data subsets depicted in FIG. 3A;

DETAILED DESCRIPTION

Figure 1:
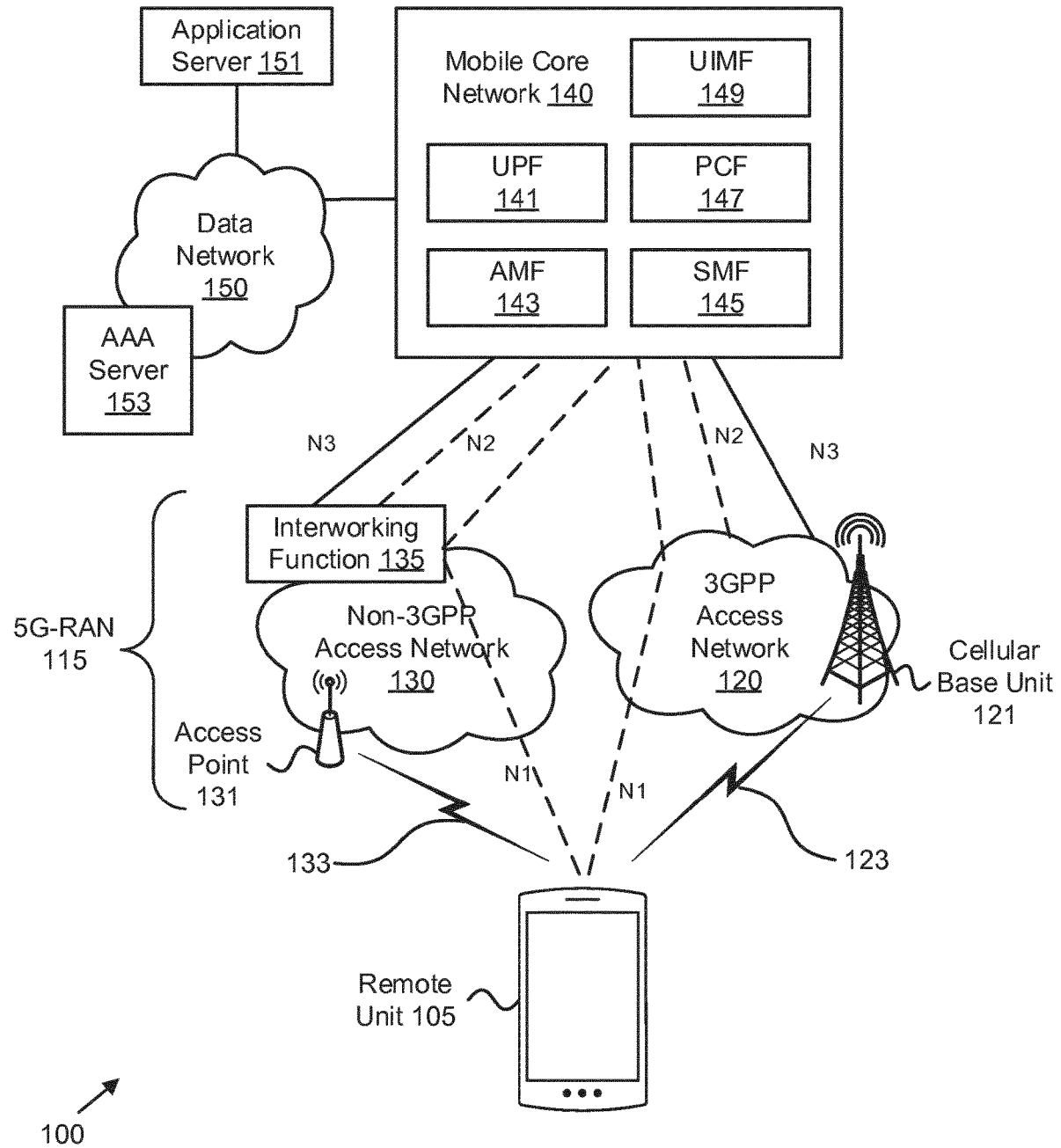
FIG. 1 is a schematic block diagram illustrating one embodiment of a wireless communication system for accessing a mobile communication network using a User Identifier.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for accessing a mobile communication network using a User Identifier. Currently, when a mobile device connects to a mobile communication network, the network identifies a subscription associated with the USIM in the device and is configured to offer mobile services based on the provisioned data in this subscription. This creates a one-to-one mapping between subscriptions and provided services. Conventionally, for a mobile user to experience different mobile services, e.g., reliable access to corporate applications (for business use) and inexpensive access to social media (for personal use), the user is required to buy different subscriptions, each one tailored to providing a different mobile experience and satisfying the needs of a certain use case.

However, under the "User Centric Identifiers and Authentication" model (see TS 22.101 and TR 22.904), a mobile subscriber may create different profiles in his/her subscription, each one suitable to providing access to different services and offering a pre-defined user experience. In a first typical case, a mobile subscriber will be able to create a "business" profile that matches his/her business communication needs, a "personal" profile that matches his/her personal communication needs, or even a "children" profile that offers safe Internet access for junior users. In a second typical case, a mobile subscriber will be able to create an "IoT" profile that could be used by his/her embedded devices when they establish connectivity via the mobile communication network. Yet, in a third typical case, a mobile subscriber will be able to create a "Netflix" profile that could be used by his/her Netflix application when it establishes connectivity via the mobile communication network. As can be seen from these typical cases, the "user" of a profile can be either a human (as in the first case), or a device (as in the second case), or even an application (as in the third case).

To enable this new model, the mobile communication network is not only required to support multiple user profiles per subscription, but it is also required to identify the traffic associated with a profile and apply the corresponding settings (including QoS, charging, service chaining, etc.) to this traffic. Described herein are techniques to enable the mobile communication network to create and manage multiple User Profiles associated with a mobile subscription. The disclosure describes (a) how a new "profile" (called User Profile) can be created and linked with a mobile subscription and (b) how a mobile data connection (i.e., PDU Session) can be associated with a User Profile, and be configured to operate based on the service settings in this User Profile.

The User Profile is to include a User Identifier, and may include one or more pieces of the following information: (a) Additional User Identifiers of the user's User Identities and potentially linked 3GPP subscriptions, (b) used UEs (identified by their subscription and device identifiers), (c) capabilities the used UEs support for authentication, (d) information regarding authentication policies required by different services and slices to authenticate a user for access to these services or slices, (e) User Identity specific service settings and parameters (to include network parameters (e.g., QoS parameters), IMS service (e.g., MMTEL supplementary services) and operator deployed service chain settings), and (f) User Identity specific network resources (e.g., network slice).

The 3GPP system shall be able to store and update a User Profile for a user. Subject to operator policy the 3GPP system shall be able to update User Profile related to a User Identifier, according to the information shared by a trusted $3^{rd}$ party. In various embodiments, the User Profiles complies with 3GPP TR 22.904 and the corresponding normative requirements in 3GPP TS 22.101, which are incorporated herein, by reference.

FIG. 1 depicts a wireless communication system 100 for accessing a mobile communication network using a User Identifier, according to embodiments of the disclosure. In one embodiment, the wireless communication system 100 includes at least one remote unit 105, a 5G-RAN 115, and a mobile core network 140. The 5G-RAN 115 and the mobile core network form a mobile communication network. The 5G-RAN 115 may be composed of a 3GPP access network 120 containing at least one cellular base unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with an application server 151 via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the 5G-RAN 115 (e.g., a 3GPP access network 120 and/or a non-3GPP access network 130). The mobile core network 140 then relays traffic between the remote unit 105 and the data network 150 (e.g., application server 151) using the PDU session. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data network and/or other remote hosts.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking function 135. The interworking function 135 provides interworking between the remote unit 105 and the mobile core network 140. In some embodiments, the interworking function 135 is a Non-3GPP Interworking Function ("N3IWF") and, in other embodiments, it is a Trusted Non-3GPP Gateway Function ("TNGF"). The N3IWF supports the connection of "untrusted" non-3GPP access networks to the mobile core network (e.g., 5GC), whereas the TNGF supports the connection of "trusted" non-3GPP access networks to the mobile core network. A non-3GPP access network 130 is considered as "trusted" when it is operated by the 3GPP operator, or a trusted partner, and supports certain security features, such as strong air-interface encryption. The interworking function 135 supports connectivity to the mobile core network 140 via the "N2" and "N3" interfaces, and it relays "N1" signaling between the remote unit 105 and the AMF 143. As depicted, both the 3GPP access network 120 and the interworking function 135 communicate with the AMF 143 using a "N2" interface. The interworking function 135 also communicates with the UPF 141 using a "N3" interface.

In one embodiment, the mobile core network 140 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one user plane function ("UPF") 141. Here, the mobile core network 140 includes at least a UPF 141 that serves the 3GPP access network 120 and the non-3GPP access network 130. Note that in certain embodiments, the mobile core network may contain one or more intermediate UPFs, for example a first intermediate UPF that serves the non-3GPP access network 130 and the second intermediate UPF that serves the 3GPP access network 120. In such embodiments, the UPF 141 would be an anchor UPF receiving UP traffic of both intermediate UPFs.

The mobile core network 140 also includes multiple control plane functions including, but not limited to, an Access and Mobility Management Function ("AMF") 143 that serves both the 3GPP access network 120 and the non-3GPP access network 130, a Session Management Function ("SMF") 145, a Policy Control Function ("PCF") 147, and a Unified Data Management function ("UDM"). In certain embodiments, the mobile core network 140 may also include an Authentication Server Function ("AUSF"), a Network Exposure Function ("NEF"), a Network Repository Function ("NRF") (used by the various NFs to discover and communicate with each other over APIs), or other NFs defined for the 5GC. In various embodiments, the mobile core network 140 may authenticate a subscriber using an authentication, authorization, and accounting ("AAA") server 153, e.g., located outside the mobile core network 140. In other embodiments, the AUSF acts as an authentication server to authenticate a subscriber.

In various embodiments, the mobile core network 140 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF 147, and the UDM. In another example, each network slice includes an AMF, an SMF and a UPF.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like.

Disclosed herein is a new application function in the mobile core network 140, called a User Identity Management Function ("UIMF") 149 which is responsible for creating the user profile and provisioning such User Profile in the operator's subscription database and to the remote units 105. The UIMF 149 creates a User Profile that includes service specific settings for a user, identified by a user identifier, accessing a UE, as described in further detail with reference to FIGS. 2A-2B. In certain embodiments, the user is able to use User Identifiers assigned by 3rd party application server. In such a case, the UIMF 149 interfaces with 3rd party application servers based on the OAuth 2.0 authentication procedure In various embodiments, the UIMF 149 is accessible by a device either via the mobile core network 140 (5GC) or via the data network 150, i.e., by using any access network other than 5G, such as a public Wi-Fi network, wireline residential access, etc. All communication between a device and the UIMF 149 takes place in the application layer, e.g., by using an MNO Application that can be downloaded to the device.

After downloading the MNO Application, a user creates an account with the UIMF 149 (referred to as a UIMF account) and confirms his/her mobile number. At this point, the created UIMF account is associated with the user's mobile subscription. The user can utilize any device to access the UIMF 149, as long as the device has the MNO Application and the user can login to the UIMF 149 using the credentials of his/her UIMF account. A device is not required to have a USIM for accessing the UIMF 149.

A mobile data connection (e.g., PDU session) associated with a User Profile may be requested by a remote unit 105 in the following cases:

Case A: A human user logs in to the remote unit 105 and the remote unit 105 remote unit 105 determines that a User Profile is associated with this user.

Case B: An application in the remote unit 105 requests a data connection and the remote unit 105 determines that a User Profile is associated with this application.

Case C: A remote unit 105 acting as a Gateway UE receives a connection request from another device and the remote unit 105 determines that a User Profile is associated with this device.

Each case is associated with a certain type of "user" (such as a human, or an application or a device) and is tailored to providing improved service experience for this type of user. For example, a User Profile associated with a human (Case A) may be tailored to supporting secure Internet browsing and enhanced voice communications. A User Profile associated with an application (Case B) may be tailored to supporting low-latency communication for this application and high reliability. Yet, a User Profile associated with a device (Case C) may be tailored to supporting reduced charging rates and optimized small-data communication.

In all these cases, the remote unit 105 identifies that a "user" (human, app, device) requests network access, it determines that the "user" is associated with a User Identifier (that is part of a User Profile) and sends a data connection request (e.g., a PDU Session establishment request), which includes the User Identifier associated with the "user" of this data connection (e.g., PDU Session). This way, the network can determine the "user" of the PDU Session and the User Profile associated with this "user" and can configure the data connection (e.g., PDU Session) to operate based on the settings of the User Profile (e.g., to provide a certain level of QoS, to provide access to certain services, etc.).

In some embodiments, the remote unit 105 determines a user requesting for a network connection and establishes a PDU session associated to a user identifier identifying a user, a device behind a gateway UE or an application using user specific credentials. Various functions in the mobile core network 140 (e.g., AMF 143, SMF 145, PCF 147) to service specific settings (e.g. QoS) for a data connection (e.g., PDU Session) based on a user identifier. Additional details for accessing a mobile communication network using a User Identifier are discussed below.

Figure 2A:
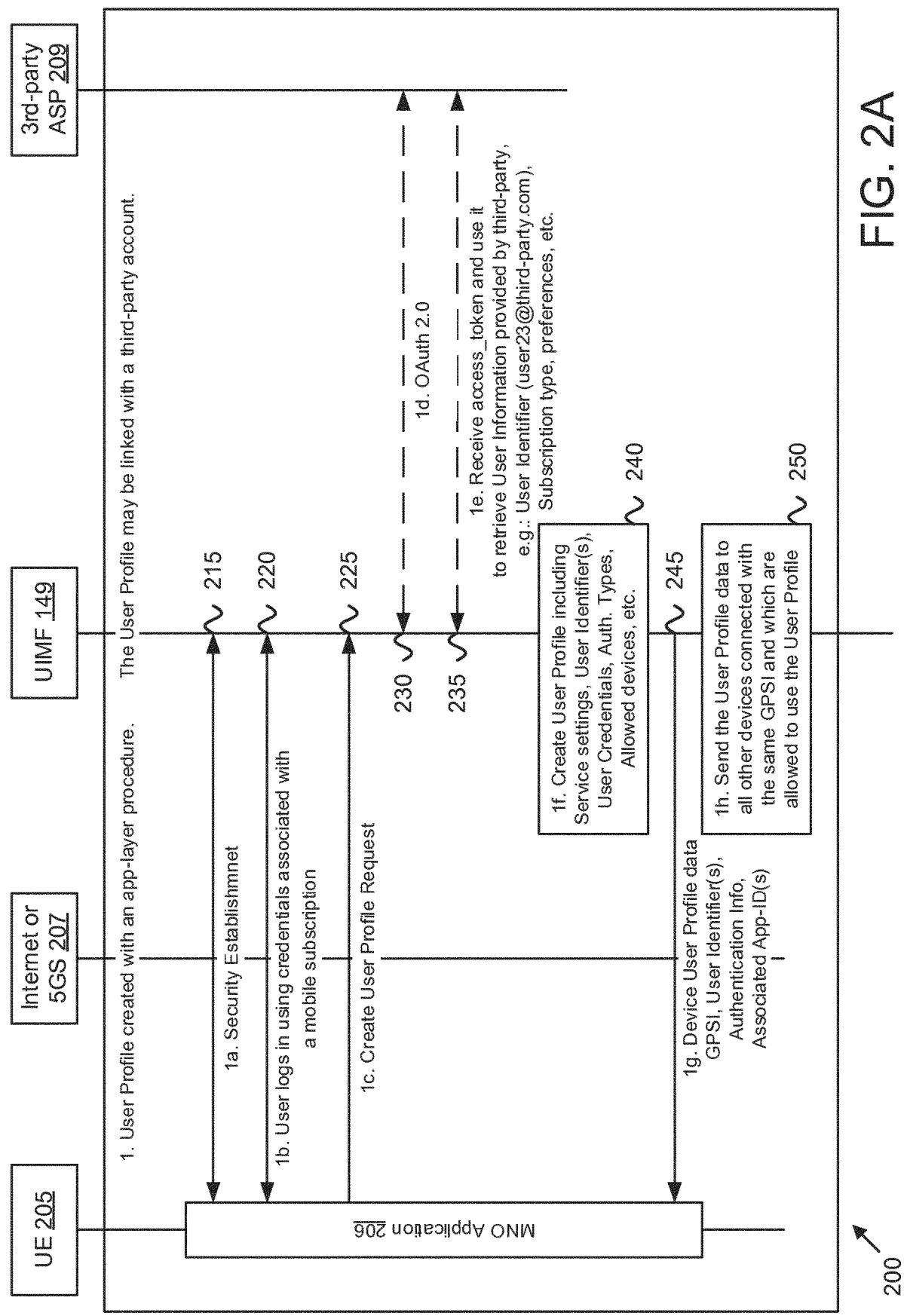
FIG. 2A is a block diagram illustrating one embodiment of a procedure for creating a User Profile.
Figure 2B:
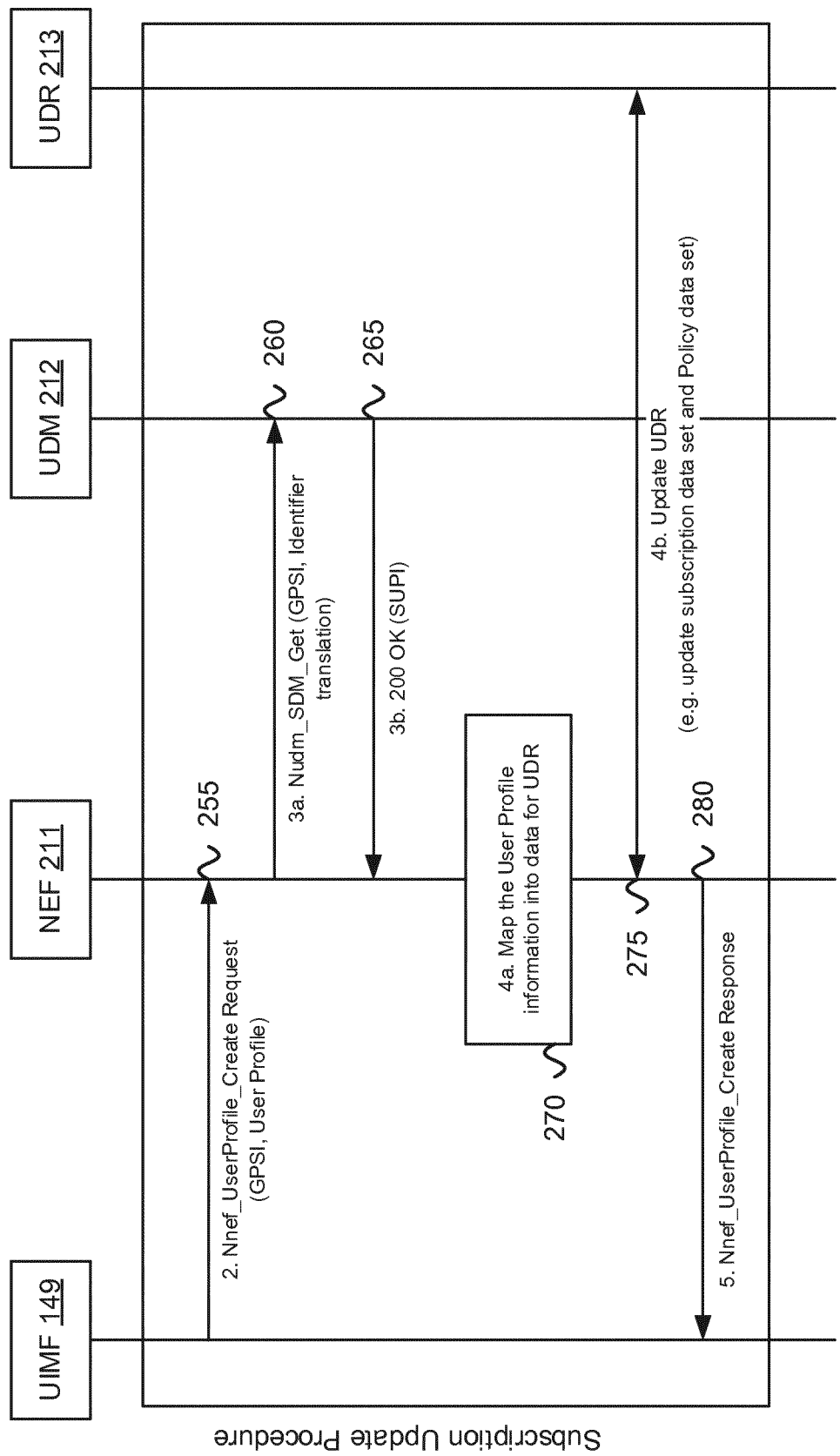
FIG. 2B is a continuation of the procedure depicted in FIG. 2A.

FIGS. 2A-2B depict a first procedure 200 for creating a User Profile, according to embodiments of the disclosure. The first procedure 200 involves a UE 205 which connects to the UIMF 149 via the 5GS and/or Internet 207 (or other data network). The first procedure 200 also involves a NEF 211, UDM 212 and UDR 213. The first procedure 200 may optionally involve a third-party application service provider ("ASP") 209, as discussed below.

At FIG. 2A, the first procedure 200 begins with a mechanism for creating a User Profile. As discussed above, the UE 205 may have installed therein an MNO Application 206 for communicating with the UIMF 149. A mobile user can utilize any device to access the UIMF 149, as long as the device has the MNO Application 206 and the user can login to the UIMF 149 using the credentials of his/her UIMF account. Accordingly, the device may be a typical smartphone equipped with a USIM module, or any USIM-less device, such as tablet, laptop, PC, etc. The user can utilize the MNO Application 206 and interact with the UIMF 149 for creating a new User Profile that is linked with her/his mobile subscription.

At Step 1a, after the MNO Application 206 is launched, a secure connection is established with the UIMF 149 (see messaging 215). In certain embodiments, the IP address of the UIMF 149 is pre-configured in the MNO Application 206. In other embodiments, the IP address of the UIMF 149 is discoverable with DNS. At Step 1b, the user logs into the UIMF 149 using the credentials of his/her UIMF account (see messaging 220). In certain embodiments, the UE 205 logs in using credentials associated with a mobile subscription of the user and/or the UE 205.

At Step 1c, using the UI of the MNO Application 206, the user requests to create a new User Profile (see messaging 225). In certain embodiments, the user selects the type of the User Profile from a list of pre-defined profiles (e.g., "safe browsing," "social media," "video streaming," etc.). In certain embodiments, the user specifies the type of the User Profile by selecting individually the services of the User Profile.

In one embodiment, the user provides a new set of credentials for this User Profile, e.g., a User Identity and a Password. In other embodiments, the user may select to link this User Profile with an existing third-party account, such as his/her Facebook account, Google account, Netflix account, etc. In this latter case, the user does not need to provide a set of credentials for the User Profile, because the existing credentials of the third-party account are reused.

At Optional Step 1d, in the case that the user decides to link the User Profile with a third-party account, the UIMF 149 triggers the known OAuth 2.0 procedure (as defined in RFC 6749) towards the third-party ASP 209 to obtain access to the user's third-party account (see messaging 230).

At Step 1e, during the OAuth 2.0 procedure, the UIMF 149 may receive an access token from a third-party application server and then employs the access token to retrieve user information from the third-party ASP 209 (see messaging 235), including a User Identity, preferences, possibly a subscription status (i.e., an indication whether the user maintains a certain subscription level (e.g., "gold" level or "silver" level) with the third-party service provider), etc.

At Step 1f, the UIMF 149 creates the new User Profile (see block 240). In case the User Profile was linked with a third-party account (with steps 1d and 1e), the UIMF may create the new User Profile by considering the user information received from the third-party ASP (in step 1e) and also the service-level agreement ("SLA") that has been setup between the mobile operator (i.e., operator of the UIMF 149) and the third-party service provider.

Figure 2C:
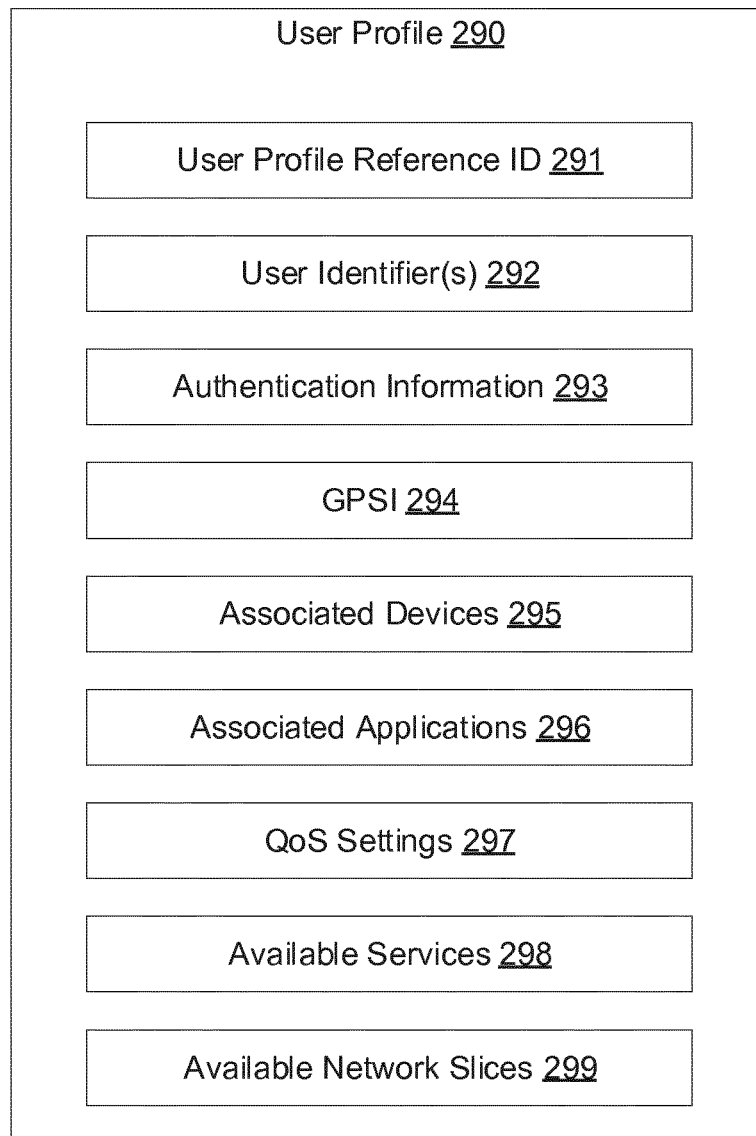
FIG. 2C is a diagram illustrating one embodiment of a User Profile.

In some embodiments, the User Profile created by the UIMF 149 is automatically linked with the user's mobile subscription, e.g., with the subscription associated with the user's UIMF account. An example User Profile is depicted in FIG. 2C and described below.

At Step 1g, the UIMF 149 sends to the MNO Application 206 the data about this User Profile (referred to as Device User Profile Data, "DUPD") that should be stored in the UE 205 (see messaging 245). The DUPD may include the User Profile Reference ID that identifies the DUPF profile within the UE, one or more User Identifiers, Authentication Info (e.g., credentials), associated applications, etc. In one embodiment, the DUPD may contain information on how a user identifier provided in step 1c is mapped to a User Reference ID. The UIMF maintains the mapping between a User Identifier to a User Reference ID for a Device User Profile.

As used herein, the User Profile Reference ID identifies a Device User Profile within a UE. The UE uses this ID to differentiate between different Device User Profiles in the UE. As used herein, the User Reference ID identifies the user. The UIMF 149 may include a User Reference ID in the Device User Profile instead of the actual User Identifier. The reason for this is due to the fact that a user may use the same user account (i.e. user identifier) for different User Profiles. The problem in such a case is that the AMF may not be able to identify the User Profile associated with this user if more than one User Profiles includes the same User Identifier. The User Reference ID solves this problem as it would be unique.

At Step 1h, the UIMF 149 sends the DUPD not only to the device that initiated the User Profile creation (e.g., UE 205), but also to all other devices connected to the UIMF 149 using the same UIMF account, which are allowed to use the User Profile (see block 250). For example, if a user has a smartphone, a tablet and a PC, all running the MNO Application 206 and being logged in to the UIMF 149 with the same UIMF account, then all three devices will receive the DUPD for the new User Profile, assuming all of them are allowed to use this User Profile. This is an important step as it synchronizes all the User Profiles of a mobile subscriber across all devices of the mobile subscriber.

Continuing at FIG. 2B, at Step 2 after the User Profile is created, the UIMF 149 sends a Create User Profile request to a network function in the 5GC, e.g., to the Network Exposure Function (NEF) 211 in order to store the created User Profile in the associated mobile subscription data (see messaging 255). The Create User Profile request contains a Generic Public Subscription Identifier ("GPSI") of the linked mobile subscription and information about the User Profile itself (referred to as "User Profile Information"). In certain embodiments, the UIMF 149 may split the User Profile information into different containers when the User Profile information is associated with Subscription Data or Policy Data. In such case the UIMF 149 may split the user profile into Access and Mobility subscription data, Session Management subscription data, SMF selection subscription data or PDU session policy control data. This is described in further details with reference to FIGS. 3A-3B.

At Step 3, the NEF 211 accesses the UDM 212 to determine the SUPI of the associated mobile subscription, which is needed before storing the User Profile in the UDR 213. At Step 3*a*, the NEF 211 provides the GPSI to the UDM 212 (see messaging 260). In certain embodiments, the NEF 211 also provides identifier translation information. At Step 3*b*, the UDM 212 returns the SUPI to the NEF 211 (see messaging 265).

At Step 4, the NEF 211 derives, from the received User Profile, updated data for one or more data sets or data subsets in the UDR 213, such as (a) Access and Mobility Subscription data, (b) Session Management Subscription data, (c) SMF Selection Subscription Data and (d) PDU Session policy control data (see block 270). Subsequently, the NEF 211 updates the corresponding data sets or subsets in the UDR 213 to contain the updated data related to the User Profile (see messaging 275). FIGS. 3A-3B illustrate one example the data sets and subsets maintained in UDR 213 and how some data subsets can be updated to include information about the new User Profile.

At Step 5, the NEF 211 responds to the UIMF 149 and completes the creation of the new User Profile (see messaging 280). The first procedure 200 for creating the User Profile ends.

FIG. 2C depicts one example of a User Profile 290, according to embodiments of the disclosure. The User Profile 290 includes one or more of the following: a User Profile Reference ID 291, User Identifier(s) 292, Authentication Information 293, GPSI 294, associated Devices 295, Associated Applications 296, QoS Settings 297, Available Services 298, and Available Network Slices 299. In one embodiment, User Reference IDs generated by the UIMF may be included as User Identifier(s). The UIMF maintains the mapping of how a User Reference ID is mapped to a user identifier.

The User Profile Reference ID 291 uniquely identifies the User Profile among all User Profiles in the same mobile subscription. The one of more User Identifiers 292 are identifiers belonging to the user and associated with the User Profile (e.g., user@example.com). Note that the User Identifier(s) 292 may include a username or other identifier associated with the third-party ASP 209.

The Authentication Information 293 includes as credentials (e.g., a password, digital certificated, etc.) and authentication types. In certain embodiments, different credentials and/or authentication types may be associated with the different User Identifiers 292.

The GPSI 294 identifies the mobile subscription linked with the User Profile. The GPSI 294 is different than the User Identifier(s) 292.

The Associated Devices 295 comprises a list of one or more devices that can use the User Profile 290. The Associated Applications 296 comprises a list of one or more applications associated with the User Profile 290.

The QoS settings 297 indicate one or more settings to be applied to the traffic associated with the User Profile 290. The Available Services 298 comprises a list of services available for the User Profile 290. The Available Network Slices 299 comprises a list of network slices available for the User Profile 290.

FIGS. 3A-3B depict one example of a UDR data set 300 for storing User Profile and multiple UDR data subsets storing User Profile information used for accessing a mobile communication network using a User Identifier, according to embodiments of the disclosure. In various embodiments, the UDR data set 300 conforms to the data sets and subsets defined in Table 5.2.12.2.1-1 of 3GPP TS 23.502, which is incorporated by reference.

The UDR data set 300 includes at least a Subscription Data set and a Policy Data set. The Subscription data may include an Access and Mobility Subscription data subset 305 having a SUPI as the data key. The Subscription data may also include a Session Management Subscription data subset 310 having a SUPI as the data key and S-NSSAI and DNN as data sub-keys. The Policy data may include a PDU Session policy control data subset 315 having a SUPI as the data key and S-NSSAI and DNN as data sub-keys. Various NFs in the 5GC may provide the data key and/or sub-keys within a data request, and the UDR may look-up the requested data using the data key and/or sub-keys.

As depicted, the Access and Mobility Subscription data subset 305 may be modified to include a list of User Profiles, as shown in underline in FIG. 3A. The list of User Profiles may include a Plurality of User Profile Identifiers. Each entry (e.g., each unique User Profile Identifier) may include a list of User Identifiers for the indicated User Profile, and lists of Allowed Devices, Allowed NSSAI, and DNNs associated with the User Profile.

As depicted, the Session Management Subscription data subset 310 may be modified to include Session Management data for one or more User Profiles, as shown in underline in FIG. 3B. Data for a User Profile may be identified using a User Profile Identifier. Each entry (e.g., each unique User Profile Identifier) may include one or more allowed S-NSSAI for the indicated User Profile, for example indicating allowed DNNs and associated DNN configuration parameters.

As depicted, the PDU Session Policy Control data subset 315 may be modified to include policy control data for one or more User Profiles, as shown in underline in FIG. 3B. Data for a User Profile may be identified using a User Profile Identifier. Each entry (e.g., each unique User Profile Identifier) may include one or more allowed S-NSSAI for the indicated User Profile, for example indicating allowed DNNs and associated Policy parameters.

Figure 4A:
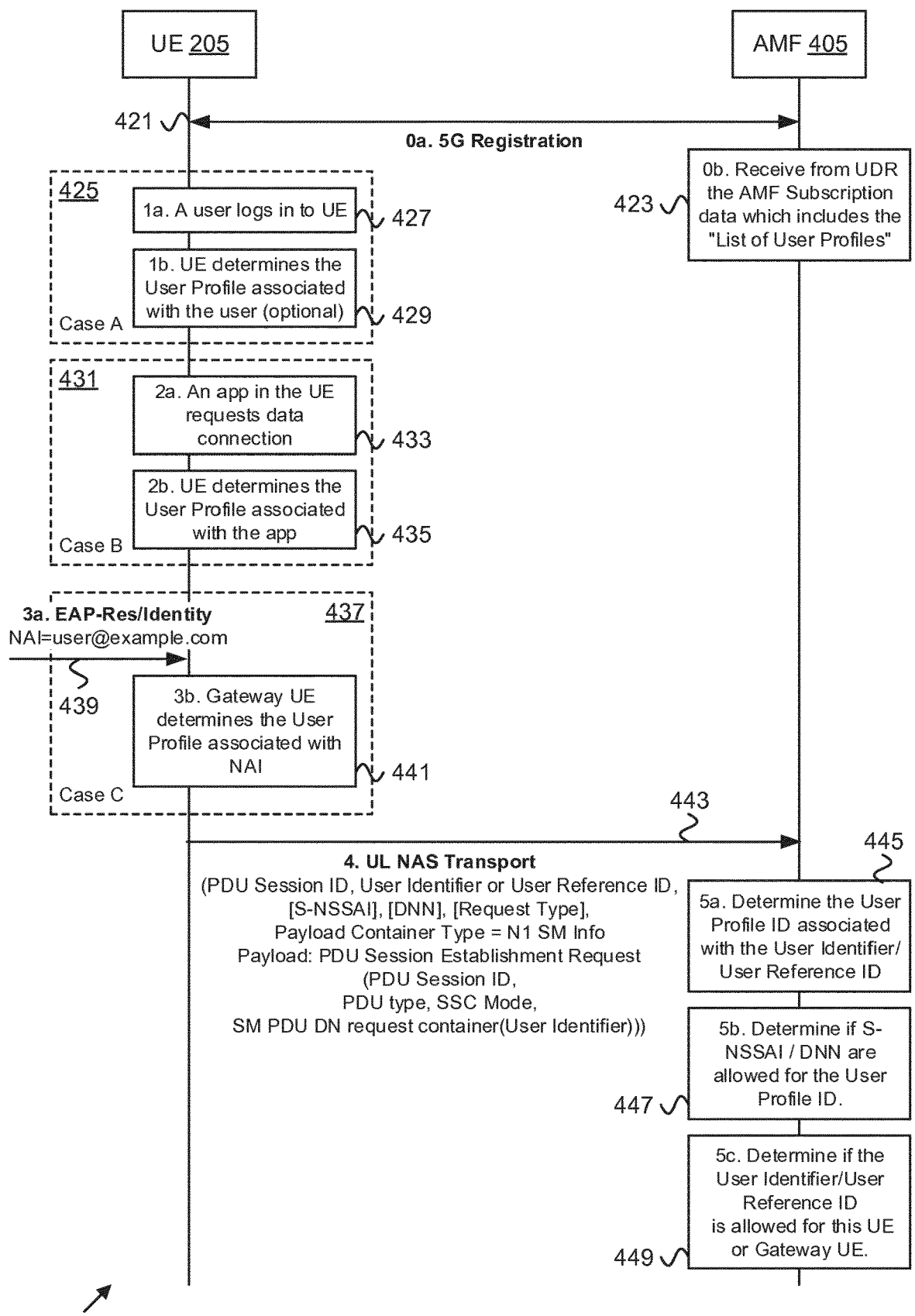
FIG. 4A is a block diagram illustrating another embodiment of a procedure for establishing a user-specific data connection.
Figure 4B:
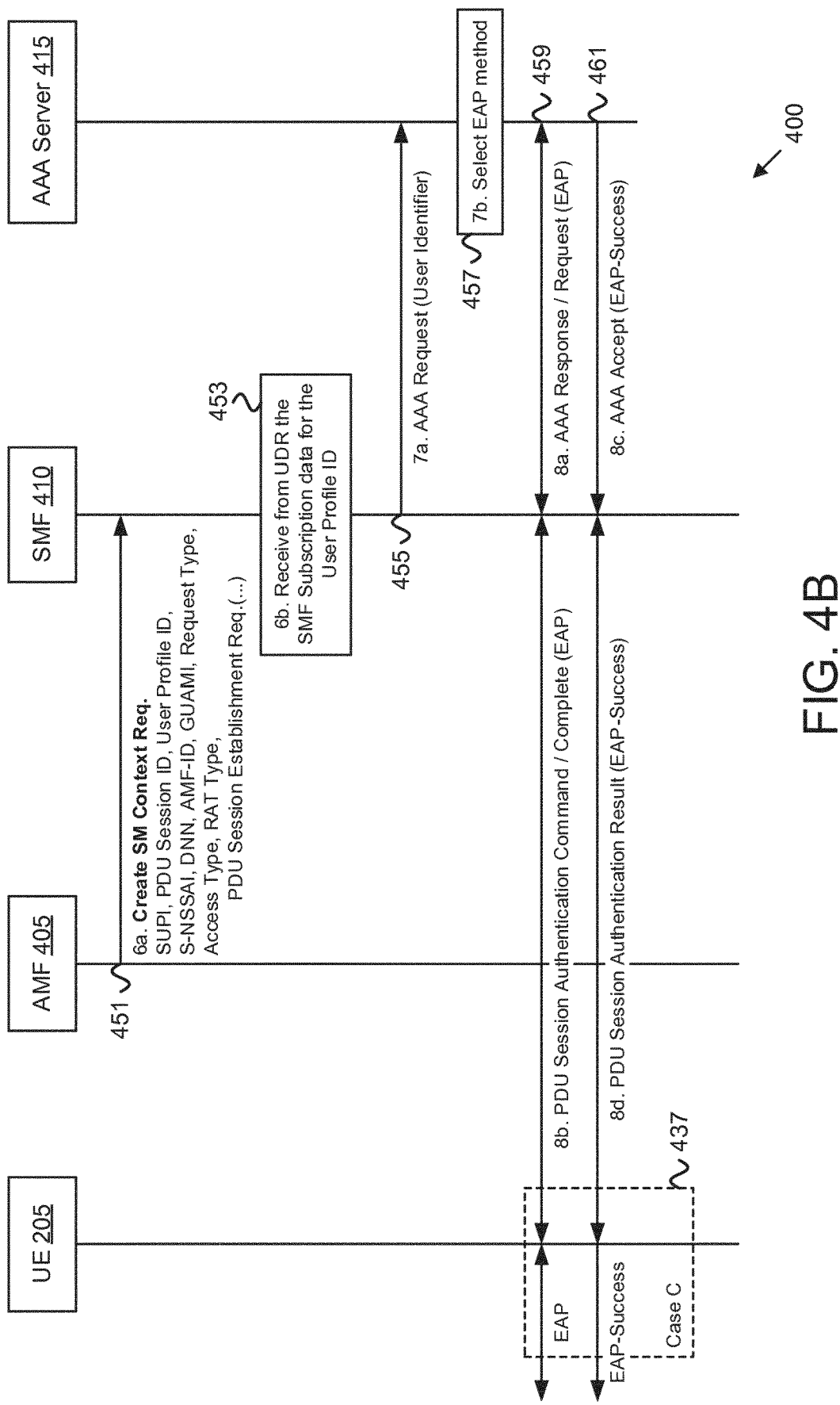
FIG. 4B is a continuation of the procedure depicted in FIG. 4A.
Figure 4C:
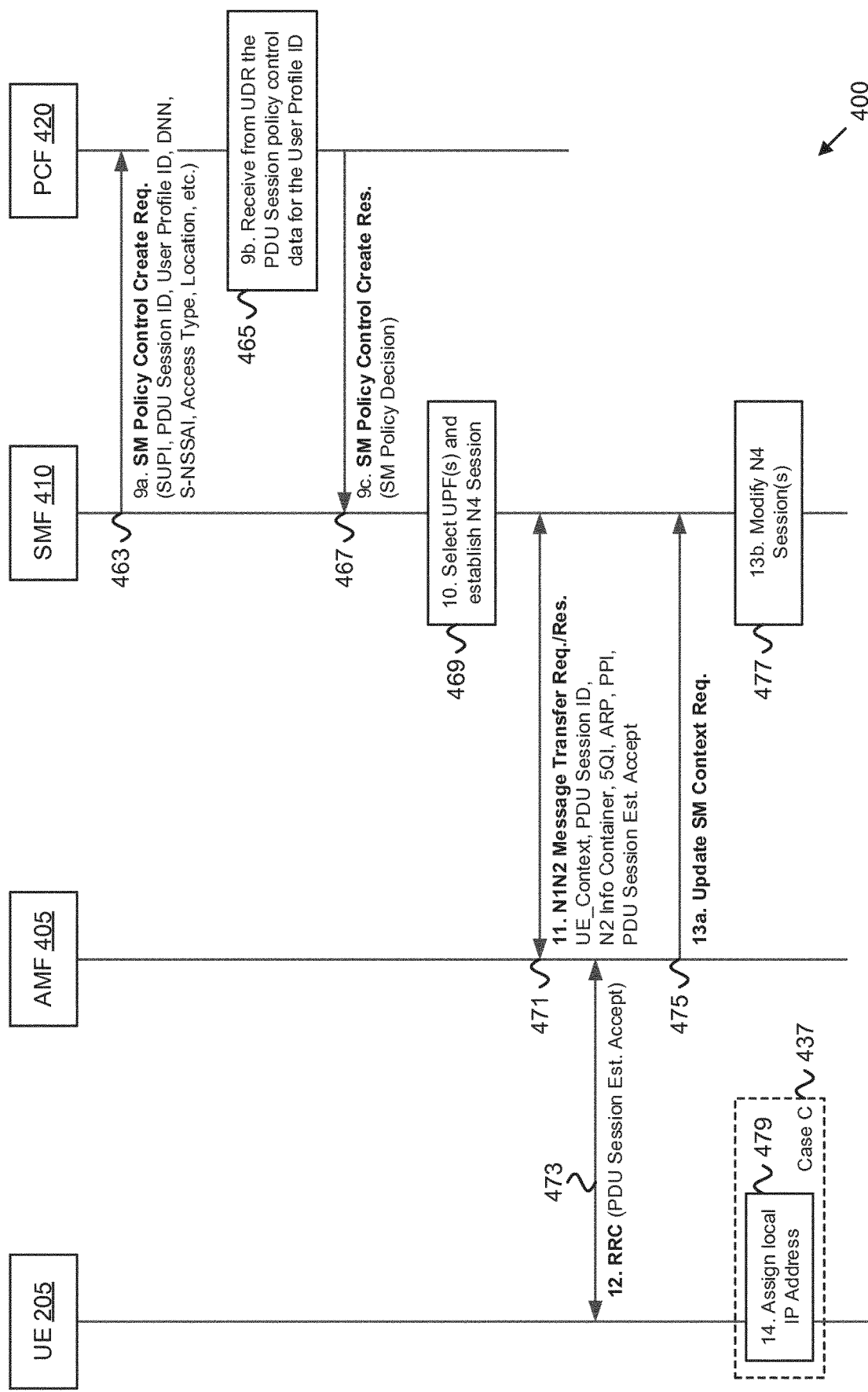
FIG. 4C is a continuation of the procedure depicted in FIGS. 4A-B.

FIGS. 4A-4C depicts a second procedure 400 for creating a mobile data connection associated with a user identifier, according to embodiments of the disclosure. The second procedure 400 involves the UE 205, an AMF 405, a SMF 410, a AAA server 415, and PCF 420. A mobile data connection (e.g., PDU Session) associated with a User Profile may be requested by a remote unit 105 in the cases described above, namely: Case A (manual login by human user), Case B (an application requests a data connection) and Case C (a Gateway UE receives a connection request from another device).

In all these cases, the UE 205 identifies that a "user" (human, app, device) requests network access, it determines that the "user" is associated with a User Identifier (that is part of a User Profile) and sends a data connection request (e.g., a PDU Session establishment request), which includes the User Identifier associated with the "user" of this data connection (e.g., PDU Session). This way, the network can determine the "user" of the PDU Session and the User Profile associated with this "user" and can configure the data connection (e.g., PDU Session) to operate based on the settings of the User Profile (e.g., to provide a certain level of QoS, to provide access to certain services, etc.).

The second procedure 400 begins with Step 0a, as the UE 205 registers to the 5G network (see signaling 421). In various embodiments, the UE 205 uses the Registration procedure described in Section 4.2.2.2 of 3GPP TS 23.502. At Step 0b, during registration the AMF 405 retrieves from the UDR (e.g., UDR 213) the subscription data which includes a list of User Profiles (identified by a User Profile Identifier) which contain a list of user identifiers, list of allowed devices, allowed DNNs and subscribed S-NSSAIs (see block 423). One example of subscription data retrieved by the AMF 405 is the Access and Mobility Subscription data subset 305 described above with reference to FIG. 3A.

The UE 205 performs Step 1 if Case A 425 applies. At Step 1a, a user logs in the device using a user identifier (see block 427). At Step 1b, the UE 205 may determine from the User Profile Data that a User Profile is associated with the User Identifier (see block 429). In one embodiment, the UE may determine from the selected User Profile that a User Identifier is mapped to a User Reference ID.

The UE 205 performs Step 1 if Case B 431 applies. At Step 2a, an application in the UE 205 requests a network (data) connection (see block 433). At Step 2b, the UE 205 determines from the User Profile Data that a User Profile is associated with this application (see block 435). In one embodiment, the UE may determine from the selected User Profile that a User Identifier is mapped to a User Reference ID.

The UE 205 performs Step 3 if Case C 437 applies. At step 3a, the UE 205 acting as a Gateway UE receives an EAP-Response/Identity message—including as NAI a user identifier—from a remote UE (see signaling 439). The Gateway UE 205 determines from the User Profile Data that a User Profile is associated with the received NAI (see block 441). In one embodiment the UE may determine from the selected User Profile that the received NAI is mapped to a User Reference ID.

At Step 4, the UE 205 sends a PDU session establishment request including the User Identifier (or User Reference ID) (determined in steps 1 or 2 or 3) in the UL NAS transport message (see signaling 443). In addition, the UE 205 includes the User Identifier in the form of an EAP-Response/Identity NAI message within the SM PDU DN Request container included within the SM PDU session establishment request container. Note that if the DUPD includes a mapping of a User Identifier to a User Reference ID, then the UE 205 sends the User Reference ID instead of the User Identifier.

At Step 5a, the AMF 405 determines, from the list of User Profiles associated to the 3GPP subscription, the user profile associated with the user identifier (or User Reference ID) provided by the UE 205 in the NAS message of the PDU session establishment request (see block 445). At Step 5b, the AMF 405 also determines from the retrieved user profile (e.g. the user specific slice subscription data) if the requested S-NSSAI and/or DNN are allowed for this PDU session (see block 447). At Step 5c, the AMF 405 also determines if the user identifier is allowed for this UE or Gateway UE (from the list of allowed Personal Equipment Identifiers ("PEIs"), see block 449).

Continuing at FIG. 4B, at Step 6a the AMF 405 selects an SMF 410 and sends a Create SM Context request (see signaling 451). The AMF 405 includes in the Create SM Context Request the User Profile Identifier of the retrieved user profile (according to step 5a).

At Step 6b, the SMF 410 retrieves from the UDR (e.g., UDR 213) the user specific Session Management Subscription Data associated to the User Profile identifier provided by the AMF (see block 453). The SMF 410 uses the User Profile to determine the address of the AAA server (if user authentication is required), authentication type required and the DNN configuration for the S-NSSAI requested. One example of subscription data retrieved by the SMF 405 is the Session Management Subscription data subset 310 described above with reference to FIG. 3B.

At Step 7a, the SMF 410 sends a AAA request message to the AAA server 415, the AAA request message including the EAP message provided by the UE in the SM PDU DN Request Container (see signaling 455). Note that the AAA server 415 may be located in the 5GC (e.g., the AAA server may be an AUSF) or it may be located outside the 5GC (e.g., the AAA server 415 may be an embodiment of the AAA server 153). At Step 7b, an authentication method is derived from the AAA server based on the user identifier provided (see block 457).

At Steps 8a-8b, the AAA server 415 starts an EAP authentication method with the SMF 410 and the SMF 410 proxies the EAP authentication to the UE 205 via a PDU session authentication command message (see signaling 459). Note that if Case C 437 applies, then the Gateway UE 205 proxies the EAP message to the remote UE behind the Gateway UE 205. At Steps 8c-8d, if Authentication is successful, then an EAP success message is sent to the UE 205 (see signaling 461). Note that if Case C 437 applies, then the Gateway UE 205 forwards the EAP success message to the remote UE behind the Gateway UE 205.

Continuing at FIG. 4C, at Step 9a the SMF 410 selects a PCF 420 and sends an SM Policy Control Create Request message including in the request the User Profile identifier of the User Profile associated to the user identifier (see signaling 463). At Step 9b, the PCF 420 retrieves from the UDR (e.g., UDR 213) the user specific PDU session policy control data according to User Profile Identifier and derives policy rules (see block 465). One example of policy control data retrieved by the PCF 420 is the PDU Session Policy Control data subset 315 described above with reference to FIG. 3B.

At Step 9c, the PCF 420 provides the Policy rules to the SMF 410 using a SM Policy Control Create response message (see signaling 467). Note that the Policy rules may include at least one user-specific policy rule derived from the retrieved PDU session policy control data. At Step 10, the SMF 410 selects UPF(s) and establish an N4 Session (see block 469).

At Steps 11-12, the SMF 410 sends a PDU session establishment accept message towards the UE 205 (see signaling 471 and 473). Having delivered the PDU session establishment accept message to the UE 205, at Step 13a the AMF 405 sends an Update SM Context request to the SMF 410 (see signaling 475) and at Step 13b the SMF 410 modifies the N4 Session(s) (see block 477). The UE 205 performs Step 14 if Case C 437 applies. Here, the Gateway UE 205 assigns a local IP address to the UE behind the gateway and routes the PDU session traffic via the local IP address (see block 479). The second procedure 400 ends.

Figure 5:
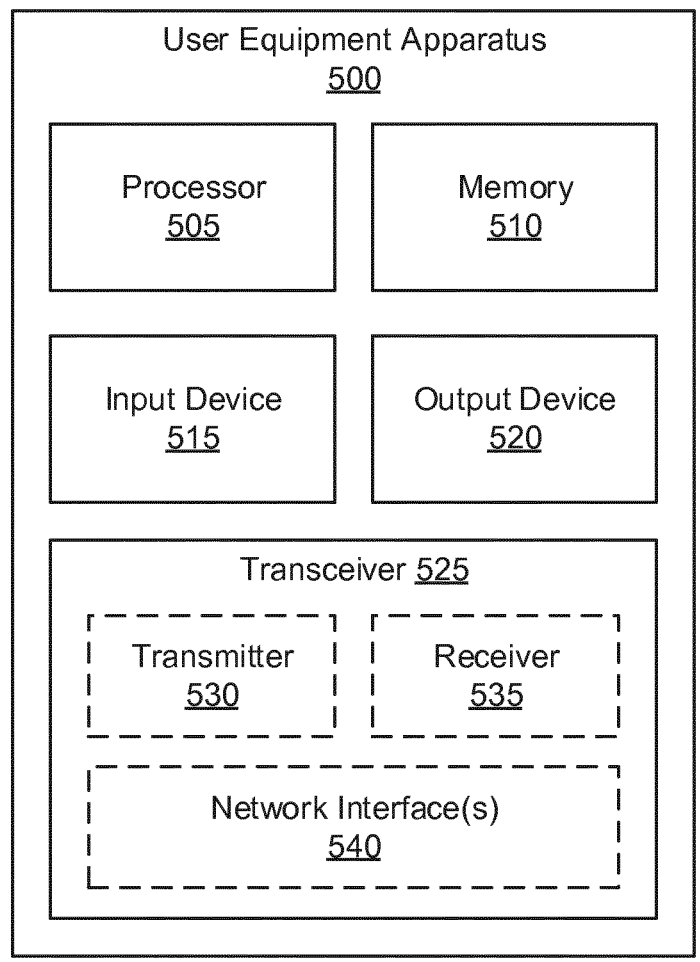
FIG. 5 is a schematic block diagram illustrating one embodiment of a user equipment apparatus for accessing a mobile communication network using a User Identifier.

FIG. 5 depicts one embodiment of a user equipment apparatus 500 that may be used for accessing a mobile communication network using a User Identifier, according to embodiments of the disclosure. The user equipment apparatus 500 may be one embodiment of the remote unit 105. Furthermore, the user equipment apparatus 500 may include a processor 505, a memory 510, an input device 515, an output device 520, a transceiver 525. In some embodiments, the input device 515 and the output device 520 are combined into a single device, such as a touch screen. In certain embodiments, the user equipment apparatus 500 does not include any input device 515 and/or output device 520.

As depicted, the transceiver 525 includes at least one transmitter 530 and at least one receiver 535. Here, the transceiver 525 communicates with a mobile core network (e.g., a 5GC) via an interworking function (e.g., TNGF or N3IWF) and over a non-3GPP access network. Additionally, the transceiver 525 may support at least one network interface 540. Here, the at least one network interface 540 facilitates communication with an eNB or gNB (e.g., using the "Uu" interface). Additionally, the at least one network interface 540 may include an interface used for communications with one or more network functions in the mobile core network, such as an UPF, an SMF, and/or a P-CSCF.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the transceiver 525 receives from a first network function (e.g., the UIMF) configuration data for a plurality of device user profiles, each device user profile in the configuration data containing at least one of: a user identifier (e.g., can be User Identifier, GPSI, or User Reference ID), associated application information, and authentication credentials.

In various embodiments, the processor 505 determines the need to establish a data connection (e.g., PDU session) with a mobile communication network and selects a first device user profile of the plurality of device user profiles to use with the data connection. The processor 505 controls the transceiver 525 to send a request to establish the data connection. Here, the request contains information based on the first device user profile including a user identifier for authenticating the request.

In certain embodiments, the processor 505 controls the transceiver 525 to send a second request to the first network function (UIMF), the second request containing a set of credentials which are associated to a mobile subscription. In some embodiments, the processor 505 performs authentication for the data connection using authentication credentials stored in the first device user profile.

In certain embodiments, the processor 505 controls the transceiver 525 to send to the first network function (UIMF) a request to create a new user profile, the new profile containing a set of credentials, wherein the configuration data for the plurality of user profiles is received in response to the request to create a new user profile. In certain embodiments, the processor 505 controls the transceiver 525 to send to the first network function (UIMF) a request to create a new user profile, the new profile request containing a selection of pre-defined profiles (e.g., safe browsing, social media, streaming). In some embodiments, the processor 505 controls the transceiver 525 to send to the first network function (UIMF) a request to create a new user profile, the new profile request linking the new user profile to an existing user account information. In such embodiments, the configuration data for the plurality of user profiles is received in response to the request to create a new user profile.

In some embodiments, the processor 505 selects the first device user profile by identifying an application associated with the need to establish a data connection and selecting a user profile corresponding to the identified application. In some embodiments, the processor 505 selects the first device user profile by detecting a user login at the UE, the user login using a first user identifier and selecting a user profile corresponding to the first user identifier.

In some embodiments, the processor 505 determines the need to establish a data connection by receiving from a remote device a connection request containing a first user identifier. In such embodiments, the processor 505 selects the first device user profile by selecting a user profile corresponding to the first user identifier. In further embodiments, the first user identifier is included as an identity within an Extensible Authentication Protocol message.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to accessing a mobile communication network using a User Identifier, for example storing Device User Profiles, user credentials, and the like. In certain embodiments, the memory 510 also stores program code and related data, such as an operating system ("OS") or other controller algorithms operating on the user equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
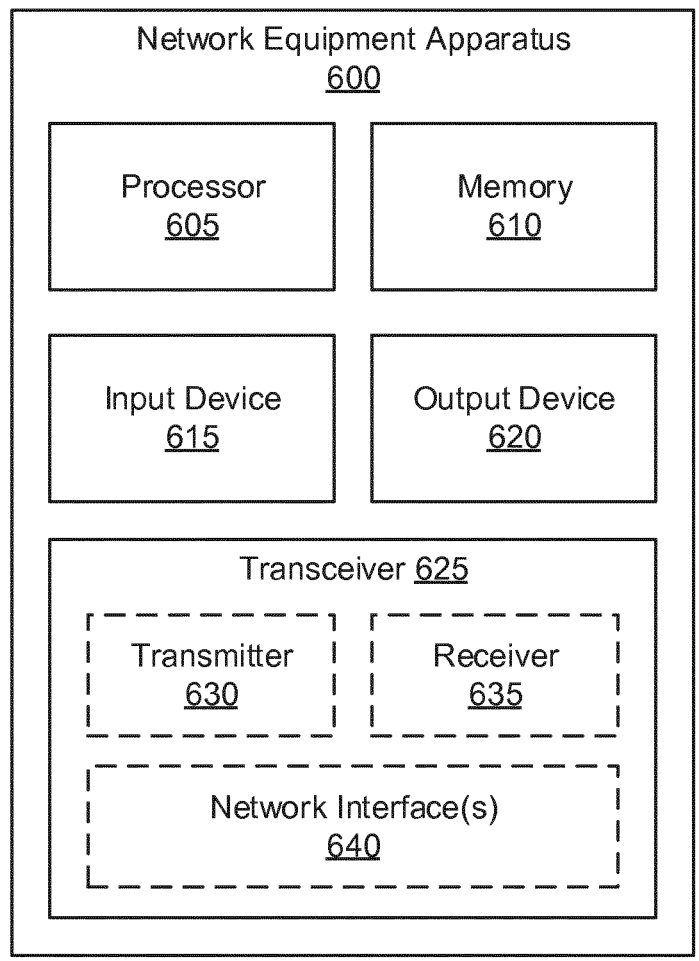
FIG. 6 is a schematic block diagram illustrating one embodiment of a network equipment apparatus for accessing a mobile communication network using a User Identifier.

FIG. 6 depicts one embodiment of a network equipment apparatus 600 that may be used for accessing a mobile communication network using a User Identifier, according to embodiments of the disclosure. The network equipment apparatus 600 may be one embodiment of the AMF 143, SMF 145, PCF 147, UIMF 149, NEF 211, AMF 405, SMF 410, and/or PCF 420. Furthermore, network equipment apparatus 600 may include a processor 605, a memory 610, an input device 615, an output device 620, a transceiver 625. In some embodiments, the input device 615 and the output device 620 are combined into a single device, such as a touch screen. In certain embodiments, the network equipment apparatus 600 does not include any input device 615 and/or output device 620.

As depicted, the transceiver 625 includes at least one transmitter 630 and at least one receiver 635. Here, the transceiver 625 communicates with one or more remote units 105 and with one or more network functions in a mobile core network. Additionally, the transceiver 625 may support at least one network interface 640. In some embodiments, the transceiver 625 supports a first interface (e.g., an N1 interface) that communicates with the control-plane of a remote unit (e.g., UE) and a second interface that communicates with control-plane network functions (e.g., SMF) in a mobile core network (e.g., a 5GC).

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the first transceiver 625.

In various embodiments, the network equipment apparatus 600 operates as a UIMF. In such embodiments, the processor 605 may establish a first connection with a UE, the first connection associated with a subscription in a mobile communication network. For example, the first connection may be established as described above with reference to steps 1a-1b of the procedure 200.

The transceiver 625 may receive a first request via the first connection to create a User Profile (e.g., as described with reference to step 1c of the procedure 200). In such embodiments, the processor 605 may determine whether the User Profile is to be linked with a third-party account (e.g., Netflix) and either 1) create the User Profile based on information in the third-party account in response to determining that the User Profile is to be linked with a third-party account, the information in the third-party account including at least one of a User Identifier, user preferences, authentication method and subscription type, or 2) create the User Profile based on information received from the first device in response to determining that the User Profile is not to be linked with a third-party account, the information received from the first device indicating a selection from pre-defined profiles.

Additionally, the processor 605 may control the transceiver 625 to send to the UE via the first connection a Device User Profile, the Device User Profile containing data from the User Profile. In some embodiments, the transceiver 625 sends the Device User Profile to one or more additional UEs associated with the mobile subscription.

Moreover, the processor 605 may send a second request to the mobile communication network to store the User Profile. Note that the mobile communication network may send a third request to a first network function containing mobile subscription information, wherein the third request includes user profile information containing one or more of user specific access and mobility subscription information, user specific session management subscription information and user specific policy subscription information.

In some embodiments, the processor 605 establishes the first connection by authenticating the UE using credentials associated with the subscription in the mobile communication network and associating the first connection with the subscription in response to successful authentication. In some embodiments, the processor 605 determines whether the User Profile is to be linked with a third-party account by determining whether the first request contains an indication that the User Profile is linked with a user account associated to a third-party (e.g., Facebook, Google, Netflix, etc.).

In some embodiments, the processor 605 creates the User Profile based on information in the third-party account by receiving an access token that provides access to data in the third-party account (e.g., the Netflix account). In other embodiments, the processor 605 creates the User Profile based on a set of credentials included in the first request in response to determining that the User Profile is not to be linked with a third-party account.

In certain embodiments, the created user profile includes additional subscription information for a user the user profile including an identifier identifying the user profile, one or more user identifiers that the user profile is applicable, a list of one or more device identifiers (e.g., PEI, IMEI) that the user profile is allowed to be applied and a list of one or more network configuration identifiers (e.g., DNN, S-NSSAI) that the user of the device is permitted to access.

In certain embodiments, the created user profile includes additional subscription information for a user the user profile including an identifier identifying the user profile, a list of one or more network configuration policies for each network slice the user is permitted to access.

In certain embodiments, the created user profile includes additional policy information the user profile including an identifier identifying the user profile and a list of one or more Quality of Service policies for each service and network slice the user is permitted to access.

In various embodiments, the network equipment apparatus 600 operates as an AMF. In such embodiments, the transceiver 625 may receive (from a UE) a first request to establish a data connection, wherein the first request includes a first identifier identifying a first user (e.g., User Identifier or User Reference ID) and user credentials to authenticate the first request. The processor 605 may retrieve from a second network function (e.g., UDR) subscription information based on PLMN subscription of the first device. For example, the processor 605 may use the SUPI associated with the first user to retrieve the subscription information.

Using the retrieved subscription information, the processor 605 determines user profile information identified by a second identifier (e.g., user profile identifier) based on the first identifier. Here, the user profile information may include user-specific access and mobility policies based on a PLMN subscription of the first device.

The processor 605 determines whether the data connection is permitted based on the user profile information and, if permitted, controls the transceiver 625 to send a second request to a third network function (e.g., SMF) to establish a session management connection, wherein the second request includes the second identifier.

In certain embodiments, the processor 605 determines whether the data connection is permitted based on the user profile information by determining if the first user identifier is authorized to use the first remote device based on the user profile information. In certain embodiments, the processor 605 determines whether the data connection is permitted based on the user profile information by determining whether a network identifier included in the first request is authorized to be used by the first user identified by the first identifier based on the user profile information, the network identifier comprising a DNN and/or S-NSSAI.

In various embodiments, the network equipment apparatus 600 operates as a SMF. In such embodiments, the transceiver 625 may receive from a first network function (e.g., an AMF) a first request to establish a data connection (e.g., PDU Session) wherein the request include a first identifier (i.e., a user profile identifier) and a second identifier to authenticate the data connection (i.e., a user identifier in SM PDU DN REQUEST container).

The processor 605 may sends a second request to a second network function (e.g., a UDR) to retrieve from the second network function user profile information identified by the first identifier (e.g., user profile identifier). In such embodiments, the second request may include the first identifier, wherein the user profile information contains user-specific session management policies (e.g., based on the SUPI and using info retrieved from UDR).

Additionally, the processor 605 may determine an AAA server address from the retrieved user profile information. The processor 605 controls the transceiver 625 to send a third request to the determined AAA server wherein the request includes the second identifier. Moreover, the processor 605 may establish a user plane for the data connection (e.g., PDU Session) based on the user profile information identified by the first identifier.

In various embodiments, the network equipment apparatus 600 operates as a PCF. In such embodiments, the transceiver 625 may receive from a first network function (e.g., from a SMF) a first request to establish a policy association, the first request being sent in response to a request to establish a data connection for a first user and in response to successful authentication of the first user, wherein the first request includes a first identifier. In such embodiments, the processor 605 may send to a second network function (e.g., to a UDR) a second request to retrieve from the second network function user profile information identified by the first identifier (e.g., a user profile identifier). Here, the second request may include the first identifier, wherein the user profile information contains user-specific Policy information.

The processor 605 may determine a set of one or more policy rules derived from user-specific Policy information retrieved by the second network function and control the transceiver 625 to send the set of policy rules to the first network function. In such embodiments, the set of policy rules directs communications of the requested data connection.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to accessing a mobile communication network using a User Identifier, for example storing a user profiles, subscriber data, and the like. In certain embodiments, the memory 610 also stores program code and related data, such as an operating system ("OS") or other controller algorithms operating on the network equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 may communicate with one or more remote units and/or with one or more interworking functions that provide access to one or more PLMNs. The transceiver 625 may also communicate with one or more network functions (e.g., in the mobile core network 140). The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like. In one embodiment, the transceiver 625 implements multiple logical transceivers using different communication protocols or protocol stacks, while using common physical hardware.

Figure 7:
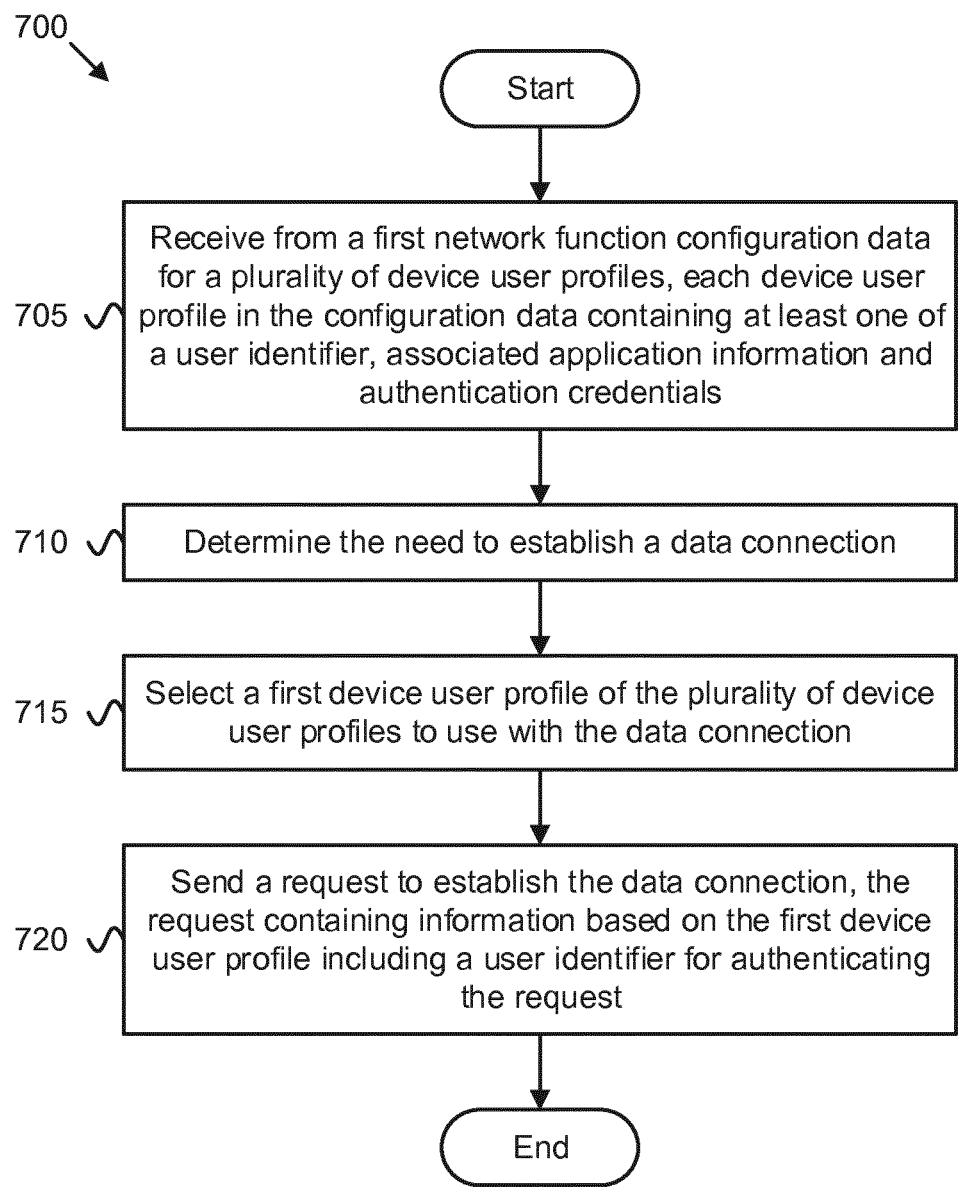
FIG. 7 is a flow chart diagram illustrating one embodiment of a first method for accessing a mobile communication network using a User Identifier.

FIG. 7 depicts a method 700 for accessing a mobile communication network using a User Identifier, according to embodiments of the disclosure. In some embodiments, the method 700 is performed by an apparatus, such as the remote unit 105, the UE 205, and/or the user equipment apparatus 500. In certain embodiments, the method 700 may be performed by a processor executing program code, for example, a microcontroller, a microprocessor, a CPU, a GPU, an auxiliary processing unit, a FPGA, or the like.

The method 700 begins and receives 705 from a first network function (e.g., a UIMF) configuration data for a plurality of device user profiles, each device user profile in the configuration data containing at least one of: a user identifier (e.g., can be User Identifier, GPSI, or User Reference ID), associated application information, and authentication credentials.

The method 700 includes determining 710 the need to establish a data connection (e.g., PDU session) with a mobile communication network. The method 700 includes selecting 715 a first device user profile of the plurality of device user profiles to use with the data connection.

The method 700 includes sending 720 a request to establish the data connection, the request containing information based on the first device user profile including a user identifier for authenticating the request. The method 700 ends.

Figure 8:
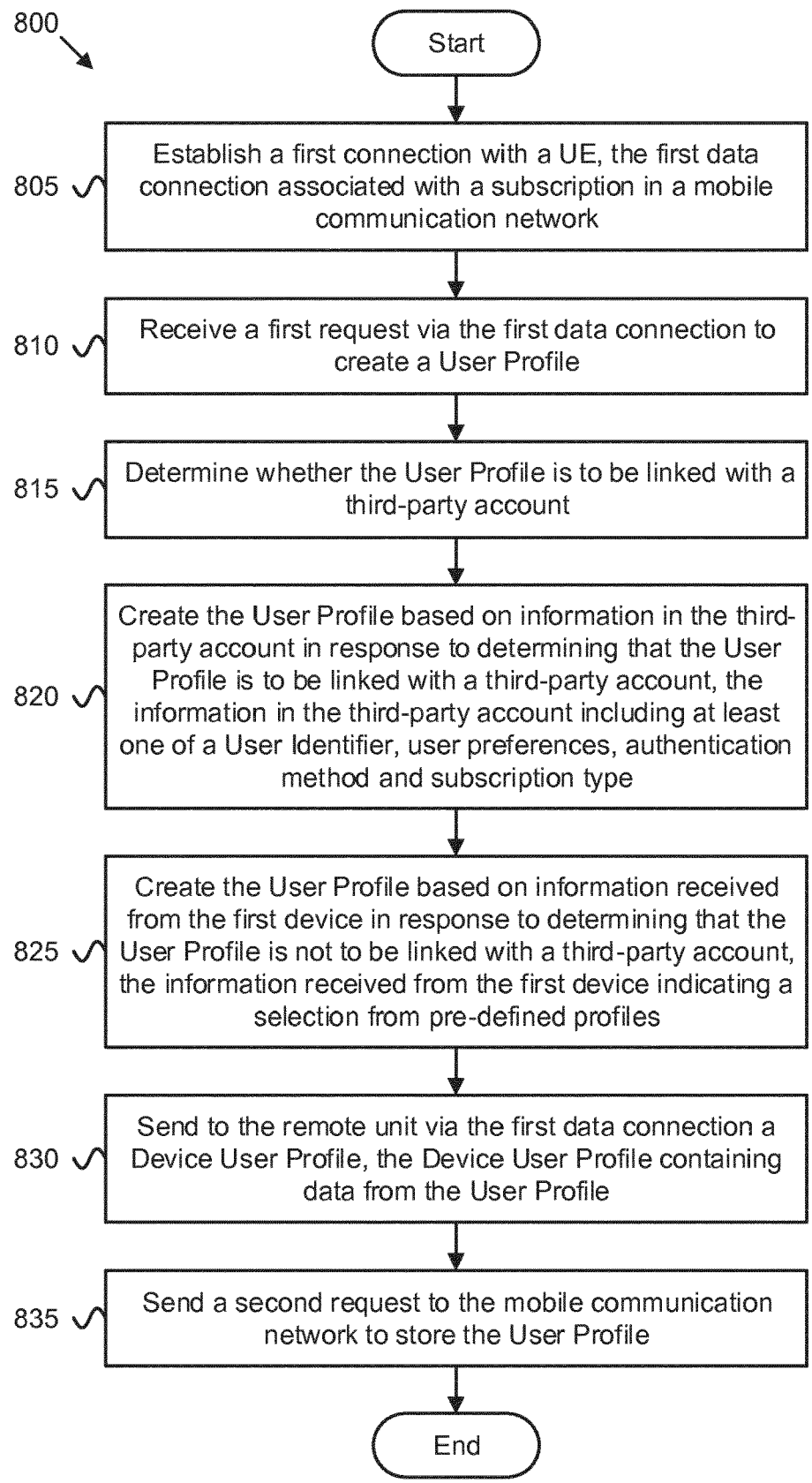
FIG. 8 is a flow chart diagram illustrating one embodiment of a second method for accessing a mobile communication network using a User Identifier.

FIG. 8 depicts a method 800 for accessing a mobile communication network using a User Identifier, according to embodiments of the disclosure. In some embodiments, the method 800 is performed by a network apparatus, such as the UIMF 149 and/or the network equipment apparatus 600. In certain embodiments, the method 800 may be performed by a processor executing program code, for example, a microcontroller, a microprocessor, a CPU, a GPU, an auxiliary processing unit, a FPGA, or the like.

The method 800 begins and establishes 805 a first connection with a UE, the first connection associated with a subscription in a mobile communication network. The method 800 includes receiving 810 a first request via the first connection to create a User Profile. The method 800 includes determining 815 whether the User Profile is to be linked with a third-party account.

The second method includes creating 820 the User Profile based on information in the third-party account in response to determining that the User Profile is to be linked with a third-party account, the information in the third-party account including at least one of a User Identifier, user preferences, authentication method and subscription type.

The method 800 includes creating 825 the User Profile based on information received from the first device in response to determining that the User Profile is not to be linked with a third-party account, the information received from the first device indicating a selection from pre-defined profiles.

The method 800 includes sending 830 to the remote unit via the first connection a Device User Profile, the Device User Profile containing data from the User Profile. The method 800 includes sending 835 a second request to the mobile communication network to store the User Profile. The method 800 ends.

Figure 9:
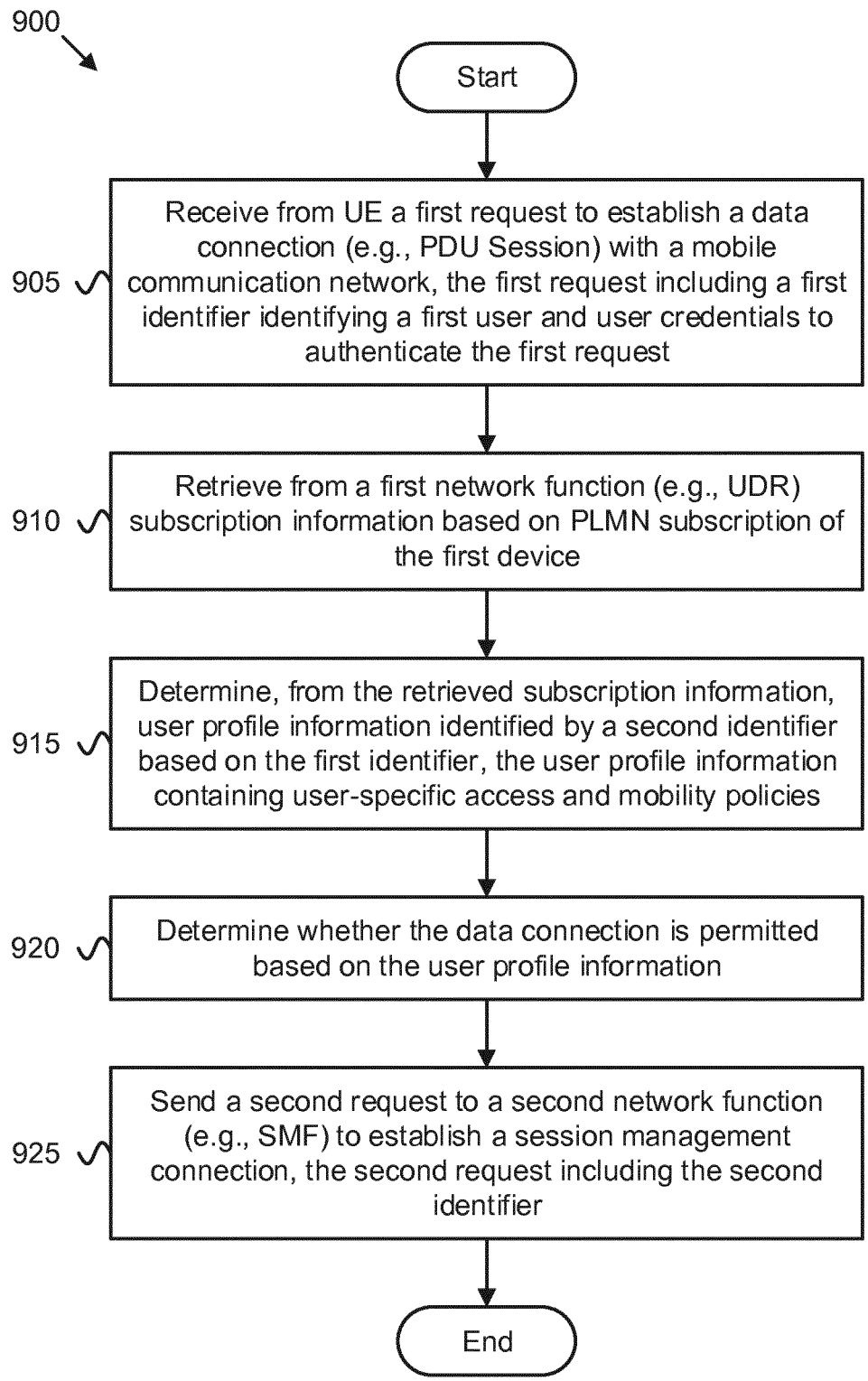
FIG. 9 is a flow chart diagram illustrating one embodiment of a third method for accessing a mobile communication network using a User Identifier.

FIG. 9 depicts a method 900 for accessing a mobile communication network using a User Identifier, according to embodiments of the disclosure. In some embodiments, the method 900 is performed by a network apparatus, such as the AMF 143, AMF 405, and/or the network equipment apparatus 600. In certain embodiments, the method 900 may be performed by a processor executing program code, for example, a microcontroller, a microprocessor, a CPU, a GPU, an auxiliary processing unit, a FPGA, or the like.

The method 900 begins and receives 905 from UE a first request to establish a data connection, wherein the first request includes a first identifier identifying a first user and user credentials to authenticate the first request. The method 900 includes retrieving 910 from a second network function subscription information based on PLMN subscription of the first device.

The method 900 includes determining 915 from the retrieved subscription information user profile information identified by a second identifier based on the first identifier, the user profile information containing user-specific access and mobility policies based on a PLMN subscription of the first device.

The method 900 includes determining 920 whether the data connection is permitted based on the user profile information. The method 900 includes sending 925 a second request to a third network function (e.g., SMF) to establish a session management connection wherein the second request includes the second identifier. The method 900 ends.

Figure 10:
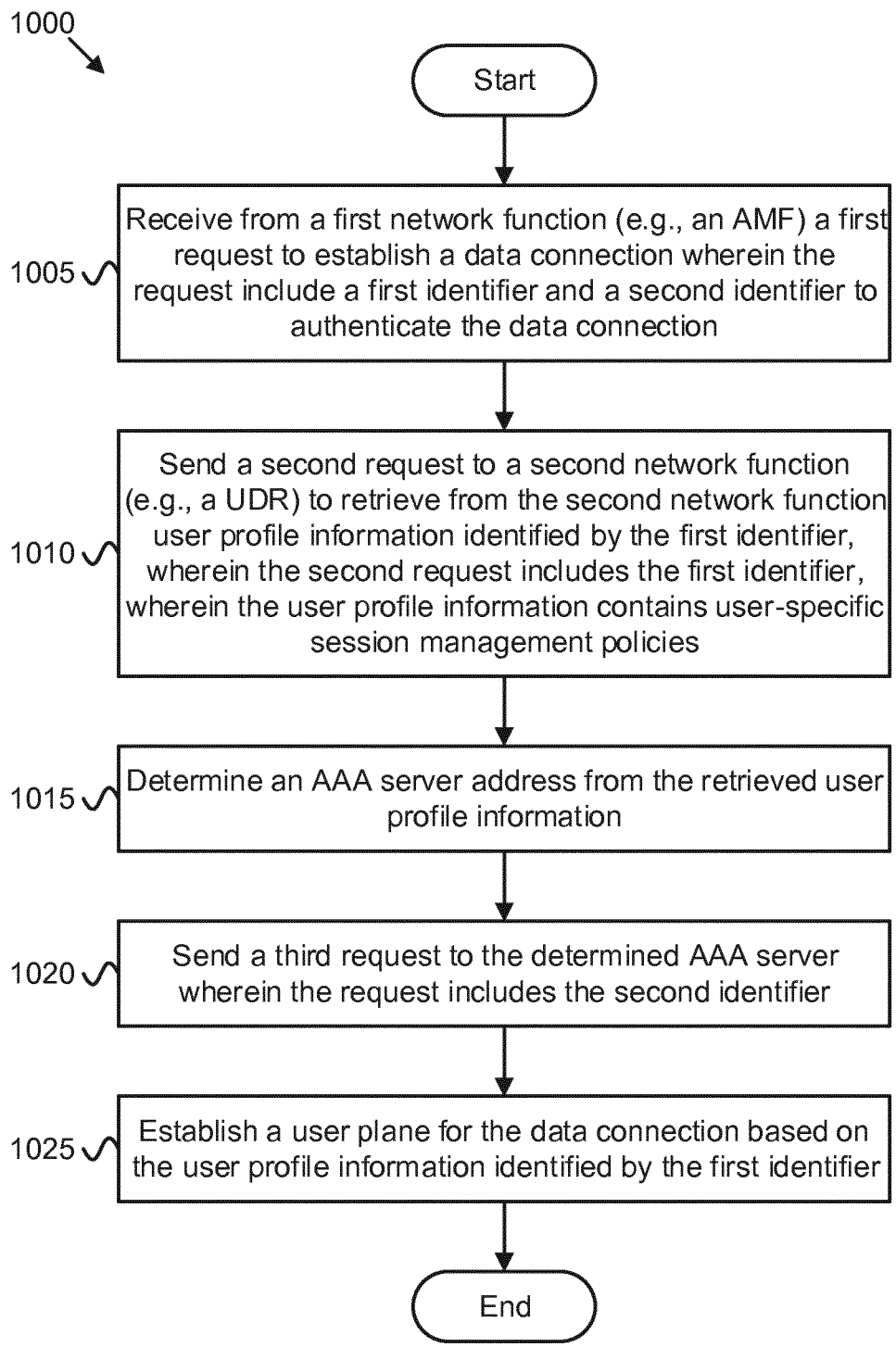
FIG. 10 is a flow chart diagram illustrating one embodiment of a fourth method for accessing a mobile communication network using a User Identifier.

FIG. 10 depicts a method 1000 for accessing a mobile communication network using a User Identifier, according to embodiments of the disclosure. In some embodiments, the method 1000 is performed by a network apparatus, such as the SMF 145, SMF 410, and/or the network equipment apparatus 600. In certain embodiments, the method 1000 may be performed by a processor executing program code, for example, a microcontroller, a microprocessor, a CPU, a GPU, an auxiliary processing unit, a FPGA, or the like.

The method 1000 begins and receives 1005 from a first network function (e.g., an AMF) a first request to establish a data connection wherein the request include a first identifier and a second identifier to authenticate the data connection.

The method 1000 includes sending 1010 a second request to a second network function (e.g., a UDR) to retrieve from the second network function user profile information identified by the first identifier. Here, the second request includes the first identifier and the user profile information contains user-specific session management policies.

The method 1000 includes determining 1015 an AAA server address from the retrieved user profile information. The method 1000 includes sending 1020 a third request to the determined AAA server wherein the request includes the second identifier. The method 1000 includes establishing 1025 a user plane for the data connection based on the user profile information identified by the first identifier. The method 1000 ends.

Figure 11:
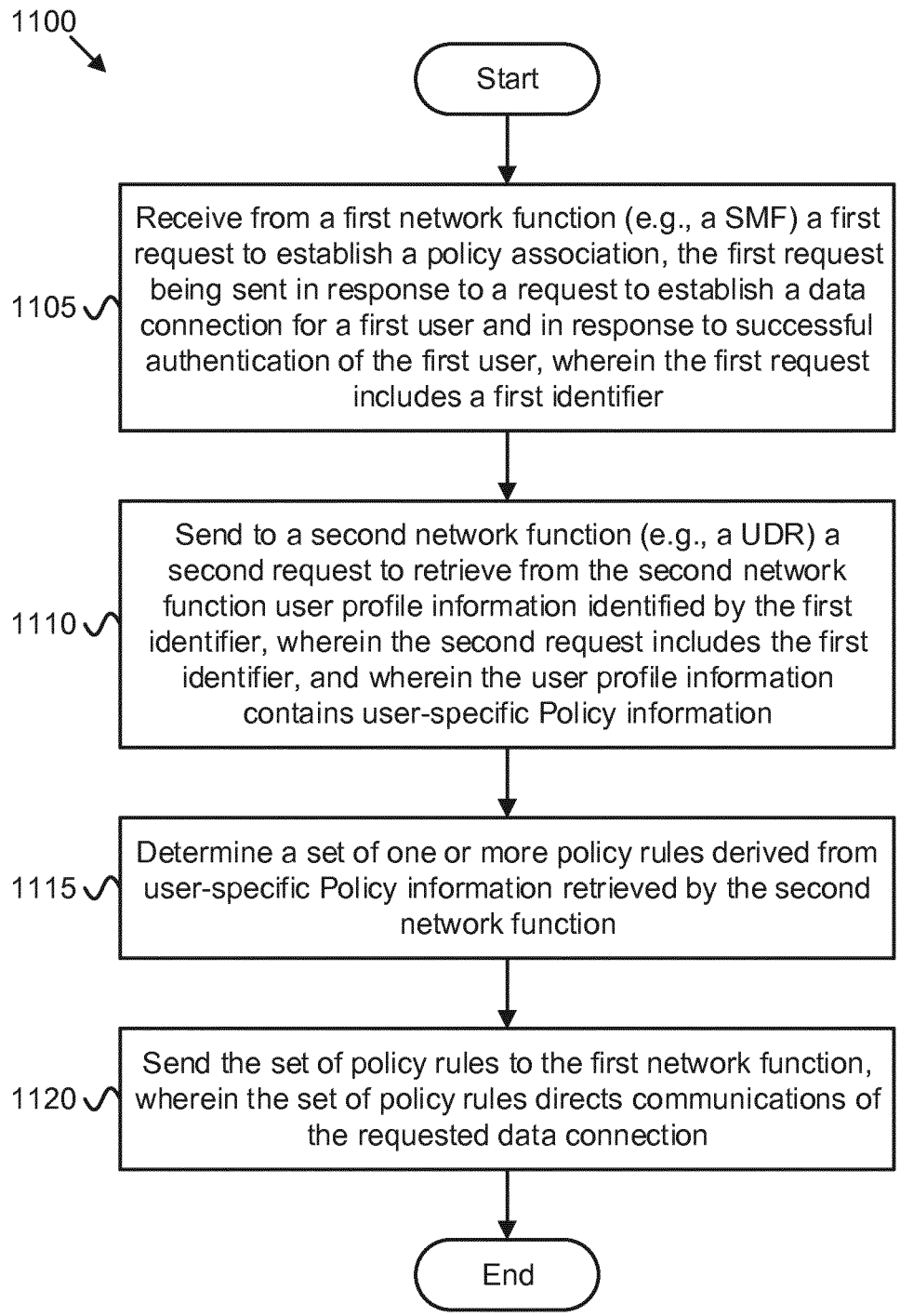
FIG. 11 is a flow chart diagram illustrating one embodiment of a fifth method for accessing a mobile communication network using a User Identifier.

FIG. 11 depicts a method 1100 for accessing a mobile communication network using a User Identifier, according to embodiments of the disclosure. In some embodiments, the method 1100 is performed by a network apparatus, such as the PCF 147, PCF 420, and/or the network equipment apparatus 600. In certain embodiments, the method 1100 may be performed by a processor executing program code, for example, a microcontroller, a microprocessor, a CPU, a GPU, an auxiliary processing unit, a FPGA, or the like.

The method 1100 begins and receives 1105 from a first network function (e.g., a SMF) a first request to establish a policy association, the first request being sent in response to a request to establish a data connection for a first user and in response to successful authentication of the first user. Here, the first request includes a first identifier.

The method 1100 includes sending 1110 to a second network function (e.g., a UDR) a second request to retrieve from the second network function user profile information identified by the first identifier (e.g., a user profile identifier). Here, the second request includes the first identifier and the user profile information contains user-specific Policy information.

The method 1100 includes determining 1115 a set of one or more policy rules derived from user-specific Policy information retrieved by the second network function. The method 1100 includes sending 1120 the set of policy rules to the first network function, wherein the set of policy rules directs communications of the requested data connection. The method 1100 ends.

Disclosed herein is a first apparatus for accessing a mobile communication network using a User Identifier, according to embodiments of the disclosure. The first apparatus may be implemented by a UE, such as the remote unit 105, the UE 205 and/or the user equipment apparatus 600. The first apparatus includes a processor and a transceiver that a transceiver that received from a first network function (i.e., the UIMF) configuration data for a plurality of device user profiles, each device user profile in the configuration data containing at least one: of a user identifier, associated application information, and authentication credentials. The processor determines the need to establish a data connection (e.g., PDU session) with a mobile communication network, selects a first device user profile of the plurality of device user profiles to use with the data connection, and sends a request to establish the data connection. Here, the request contains information based on the first device user profile including a user identifier for authenticating the request.

In some embodiments, the processor sends to the first network function a second request, said second request containing a set of credentials which are associated to a mobile subscription. In some embodiments, the processor performs authentication for the data connection using authentication credentials stored in the first device user profile.

In some embodiments, the processor sends to the first network function a request to create a new user profile, said request containing a set of credentials, wherein the configuration data for the plurality of user profiles is received in response to the request to create a new user profile. In one embodiment, the request to create a new user profile contains a selection of pre-defined profiles (e.g., safe browsing, social media, streaming). In another embodiment, the request to create a new user profile links the new user profile to an existing user account information.

In certain embodiments, selecting the first device user profile comprises identifying an application associated with the need to establish a data connection and selecting a user profile corresponding to the identified application. In certain embodiments, selecting the first device user profile comprises detecting a user login at the UE, the user login using a first user identifier and selecting a user profile corresponding to the first user identifier.

In certain embodiments, determining the need to establish a data connection comprises receiving from a remote device a connection request containing a first user identifier, wherein selecting the first device user profile comprises selecting a user profile corresponding to the first user identifier. In such embodiments, the first user identifier may be included as an identity within an Extensible Authentication Protocol message.

Disclosed herein is a second apparatus for accessing a mobile communication network using a User Identifier, according to embodiments of the disclosure. The second apparatus may be implemented by a UIMF, such as the UIMF 149 and/or the network equipment apparatus 600. The second apparatus includes a processor that establishes a first connection with a remote unit (i.e., the UE), the first connection associated with a subscription in a mobile communication network and a transceiver that receives a first request via the first connection to create a User Profile.

The processor further: determines whether the User Profile is to be linked with a third-party account; creates the User Profile based on information in the third-party account in response to determining that the User Profile is to be linked with a third-party account, the information in the third-party account including at least one of a User Identifier, user preferences, authentication method and subscription type; and creates the User Profile based on information received from the first device in response to determining that the User Profile is not to be linked with a third-party account, the information received from the first device indicating a selection from pre-defined profiles. Moreover, the transceiver further sends to the remote unit via the first connection a Device User Profile, the Device User Profile containing data from the User Profile and sends a second request to the mobile communication network to store the User Profile.

In certain embodiments, establishing the first connection includes authenticating the remote unit using credentials associated with the subscription in the mobile communication network and associating the first connection with the subscription in response to successful authentication. In certain embodiments, determining whether the User Profile is to be linked with a third-party account comprises determining whether the first request contains an indication that the User Profile is linked with a user account associated to a third-party.

In some embodiments, creating the User Profile based on information in the third-party account comprises receiving an access token that provides access to data in the third-party account. In some embodiments, the processor creates the User Profile based on a set of credentials included in the first request in response to determining that the User Profile is not to be linked with a third-party account.

In some embodiments, the transceiver sends the Device User Profile to one or more additional remote units associated with the mobile subscription. In certain embodiments, the mobile communication network sends a third request to a first network function containing mobile subscription information, wherein the third request includes user profile information containing one or more of user specific access and mobility subscription information, user specific session management subscription information and user specific policy subscription information.

In some embodiments, the created user profile includes additional subscription information for a user the user profile including an identifier identifying the user profile, one or more user identifiers that the user profile is applicable, a list of one or more device identifiers (e.g., PEI, IMEI) that the user profile is allowed to be applied and a list of one or more network configuration identifiers (e.g., DNN, S-NSSAI) that the user of the device is permitted to access.

In some embodiments, the created user profile includes additional subscription information for a user the user profile including an identifier identifying the user profile, a list of one or more network configuration policies for each network slice the user is permitted to access. In some embodiments, the created user profile includes additional policy information the user profile including an identifier identifying the user profile and a list of one or more Quality of Service policies for each service and network slice the user is permitted to access.

Disclosed herein is a third apparatus for accessing a mobile communication network using a User Identifier, according to embodiments of the disclosure. The third apparatus may be implemented by an AMF, such as the AMF 143, the AMF 405, and/or the network equipment apparatus 600. The third apparatus includes a processor and a transceiver that receives from UE a first request to establish a data connection, wherein the first request includes a first identifier identifying a first user (e.g., User Identifier or User Reference ID) and user credentials to authenticate the first request. The processor retrieves from a second network function subscription information based on PLMN subscription of the first device (e.g., info retrieved from the UDR based on the SUPI) and determines from the retrieved subscription information user profile information identified by a second identifier (e.g., user profile identifier) based on the first identifier. Here, the user profile information contains user-specific access and mobility policies based on a PLMN subscription of the first device. The processor determines whether the data connection is permitted based on the user profile information and sends a second request to a third network function (e.g., SMF) to establish a session management connection wherein the second request includes the second identifier.

In certain embodiments, determining whether the data connection is permitted based on the user profile information comprises determining if the first user identifier is authorized to use the first remote device based on the user profile information.

In certain embodiments, determining whether the data connection is permitted based on the user profile information comprises determining whether a network identifier included in the first request is authorized to be used by the first user identified by the first identifier based on the user profile information, the network identifier comprising a DNN and/or S-NSSAI.

Disclosed herein is a fourth apparatus for accessing a mobile communication network using a User Identifier, according to embodiments of the disclosure. The third apparatus may be implemented by an SMF, such as the SMF 145, the SMF 410, and/or the network equipment apparatus 600. The fourth apparatus includes a processor and a transceiver that receives from a first network function (e.g., an AMF) a first request to establish a data connection wherein the request include a first identifier (i.e., identifying the user profile information) and a second identifier to authenticate the data connection (i.e., a user identifier in SM PDU DN REQUEST container). The processor sends a second request to a second network function (e.g., a UDR) to retrieve from the second network function user profile information identified by the first identifier (e.g., user profile identifier), wherein the second request includes the first identifier, wherein the user profile information contains user-specific session management policies (e.g., based on the SUPI and using info retrieved from UDR). The processor determines an AAA server address from the retrieved user profile information and sends a third request to the determined AAA server wherein the request includes the second identifier. The processor establishes a user plane for the data connection based on the user profile information identified by the first identifier.

Disclosed herein is a fifth apparatus for accessing a mobile communication network using a User Identifier, according to embodiments of the disclosure. The fifth apparatus may be implemented by a PCF, such as the PCF 147, the PCF 420, and/or the network equipment apparatus 600. The fifth apparatus includes a processor and a transceiver that a transceiver that receives from a first network function (e.g., from a SMF) a first request to establish a policy association, the first request being sent in response to a request to establish a data connection for a first user and in response to successful authentication of the first user, wherein the first request includes a first identifier. The processor sends to a second network function (e.g., to a UDR) a second request to retrieve from the second network function user profile information identified by the first identifier (e.g., a user profile identifier). Here, the second request includes the first identifier, and wherein the user profile information contains user-specific Policy information. The processor determines a set of one or more policy rules derived from user-specific Policy information retrieved by the second network function and sends the set of policy rules to the first network function. Here, the set of policy rules directs communications of the requested data connection.

Disclosed herein is a first system for accessing a mobile communication network using a User Identifier, according to embodiments of the disclosure. The first system includes an AMF, a SMF and UDR. In various embodiments, the AMF: 1) receives from a UE a first request to establish a data connection to first network function, wherein the first request includes a first identifier identifying a first user and user credentials to authenticate the first request, 2) retrieves from the UDR subscription information based on PLMN subscription of the first device, 3) determines from the retrieved subscription information user profile information identified by a second identifier (e.g., user profile identifier) based on the first identifier, the user profile information containing user-specific access and mobility policies, 4) determines whether the data connection is permitted based on the user profile information, and 5) sends a second request to the SMF to establish a session management connection wherein the second request includes the second identifier. In such embodiments, the SMF authenticates the first user and establishes a user plane for the first data connection based on the user profile information identified by the second identifier.

In certain embodiments, determining whether the data connection is permitted based on the user profile information comprises the access management function determining if the first user identifier is authorized to use the first device based on the user profile information. In certain embodiments, determining whether the data connection is permitted based on the user profile information comprises the access management function determining whether a network identifier included in the first request is authorized to be used by the first user identified by the first identifier based on the user profile information, the network identifier comprising a DNN and/or S-NSSAI.

In some embodiments, the SMF retrieves user profile information based on the second identifier from the UDR, the user profile information containing user-specific Session Management policies. In such embodiments, the SMF authenticates the first user by: 1) determining from the user profile information if the first request requires user authentication by an authentication function responsible for user authentication (e.g., via AAA server); and 2) sending a third request to the authentication function to authorize the first request, wherein the third request includes user credentials provided in the first request.

In certain embodiments, the system includes a policy control function ("PCF"). Here, the SMF may establish the user plane for the first data connection by: 1) sending a fourth request to the PCF to establish a policy association in response to successful authentication of the first user, wherein the fourth request includes the second identifier; and 2) receiving a set of one or more policy rules derived from user-specific profile information retrieved by the PCF, wherein the PCF retrieves the user-specific profile information from the UDR based on the second identifier.

Disclosed herein is a first method for accessing a mobile communication network using a User Identifier, according to embodiments of the disclosure. The first method may be performed by a UE, such as the remote unit 105, the UE 205 and/or the user equipment apparatus 500. The first method includes receiving from a first network function (e.g., a UIMF) configuration data for a plurality of device user profiles, each device user profile in the configuration data containing at least one of: a user identifier, associated application, information, and authentication credentials. The first method includes determining the need to establish a data connection (e.g., PDU session) with a mobile communication network. The first method includes selecting a first device user profile of the plurality of device user profiles to use with the data connection and sending a request to establish the data connection. Here, the request contains information based on the first device user profile including a user identifier for authenticating the request.

In some embodiments, the first method includes sending to the first network function a second request, said second request containing a set of credentials which are associated to a mobile subscription. In some embodiments, the first method includes sending to the first network function a second request to create a new user profile, said request containing a set of credentials, wherein the configuration data for the plurality of user profiles is received in response to the request to create a new user profile. In such embodiments, the request to create a new user profile may contain a selection of pre-defined profiles (e.g., safe browsing, social media, streaming).

In some embodiments, the first method includes sending to the first network function a second request to create a new user profile, said request linking the new user profile to an existing user account information, wherein the configuration data for the plurality of user profiles is received in response to the request to create a new user profile.

In certain embodiments, selecting the first device user profile comprises identifying an application associated with the need to establish a data connection and selecting a user profile corresponding to the identified application. In certain embodiments, selecting the first device user profile comprises detecting a user login at the UE, the user login using a first user identifier and selecting a user profile corresponding to the first user identifier.

In certain embodiments, determining the need to establish a data connection comprises receiving from a remote device a connection request containing a first user identifier, wherein selecting the first device user profile comprises selecting a user profile corresponding to the first user identifier. In such embodiments, the first user identifier may be included as an identity within an Extensible Authentication Protocol message.

In some embodiments, the first method includes performing authentication for the data connection using authentication credentials stored in the first device user profile.

Disclosed herein is a second method for accessing a mobile communication network using a User Identifier, according to embodiments of the disclosure. The second method may be performed by a UIMF, such as the UIMF 149 and/or the network equipment apparatus 600. The second method includes establishing a first connection with a remote unit (i.e., the UE), the first connection associated with a subscription in a mobile communication network. The second method includes receiving a first request via the first connection to create a User Profile. The second method includes determining whether the User Profile is to be linked with a third-party account.

The second method includes creating the User Profile based on information in the third-party account in response to determining that the User Profile is to be linked with a third-party account, the information in the third-party account including at least one of a User Identifier, user preferences, authentication method and subscription type. The second method includes creating the User Profile based on information received from the first device in response to determining that the User Profile is not to be linked with a third-party account, the information received from the first device indicating a selection from pre-defined profiles. The second method includes sending to the remote unit via the first connection a Device User Profile, the Device User Profile containing data from the User Profile. The second method includes sending a second request to the mobile communication network to store the User Profile.

In certain embodiments, establishing the first connection comprises: authenticating the remote unit using credentials associated with the subscription in the mobile communication network and associating the first connection with the subscription in response to successful authentication.

In certain embodiments, determining whether the User Profile is to be linked with a third-party account comprises determining whether the first request contains an indication that the User Profile is linked with a user account associated to a third-party.

In some embodiments, creating the User Profile based on information in the third-party account comprises receiving an access token that provides access to data in the third-party account. In other embodiments, the second method includes creating the User Profile based on a set of credentials included in the first request in response to determining that the User Profile is not to be linked with a third-party account.

In some embodiments, the second method includes sending the Device User Profile to one or more additional remote units associated with the mobile subscription.

In certain embodiments, the created user profile includes additional subscription information for a user the user profile including an identifier identifying the user profile, one or more user identifiers that the user profile is applicable, a list of one or more device identifiers (e.g., PEI, IMEI) that the user profile is allowed to be applied and a list of one or more network configuration identifiers (e.g., DNN, S-NSSAI) that the user of the device is permitted to access.

In certain embodiments, the created user profile includes additional subscription information for a user the user profile including an identifier identifying the user profile, a list of one or more network configuration policies for each network slice the user is permitted to access. In certain embodiments, the created user profile includes additional policy information the user profile including an identifier identifying the user profile and a list of one or more Quality of Service policies for each service and network slice the user is permitted to access.

In some embodiments, the mobile communication network sends a third request to a first network function (e.g., containing mobile subscription information, wherein the third request includes user profile information containing one or more of user specific access and mobility subscription information, user specific session management subscription information and user specific policy subscription information.

Disclosed herein is a third method for accessing a mobile communication network using a User Identifier, according to embodiments of the disclosure. The third method may be performed by an AMF, such as the AMF 143, the AMF 405, and/or the network equipment apparatus 600. The third method includes receiving from UE a first request to establish a data connection, wherein the first request includes a first identifier identifying a first user (e.g., User Identifier or User Reference ID) and user credentials to authenticate the first request (e.g., user identifier included in the SM PDU DN Request Container). The third method includes retrieving from a first network function (e.g., a UDR) subscription information based on PLMN subscription of the first device (e.g., info retrieved from the UDR based on the SUPI). The third method includes determining from the retrieved subscription information user profile information identified by a second identifier (e.g., user profile identifier) based on the first identifier, the user profile information containing user-specific access and mobility policies based on a PLMN subscription of the first device. The third method includes determining whether the data connection is permitted based on the user profile information. The third method includes sending a second request to a second network function (e.g., a SMF) to establish a session management connection wherein the second request includes the second identifier.

In certain embodiments, determining whether the data connection is permitted based on the user profile information comprises determining if the first user identifier is authorized to use the first remote device based on the user profile information;

In certain embodiments, determining whether the data connection is permitted based on the user profile information comprises determining whether a network identifier included in the first request is authorized to be used by the first user identified by the first identifier based on the user profile information, the network identifier comprising a DNN and/or S-NSSAI.

Disclosed herein is a fourth method for accessing a mobile communication network using a User Identifier, according to embodiments of the disclosure. The fourth method may be performed by a SMF, such as the UIMF 149 and/or the network equipment apparatus 600. The fourth method includes receiving from a first network function (e.g., an AMF) a first request to establish a data connection wherein the request include a first identifier (e.g., identifying the user profile information) and a second identifier to authenticate the data connection. The fourth method includes sending a second request to a second network function (e.g., a UDR) to retrieve user profile information identified by the first identifier (e.g., the user profile identifier). Here, the second request includes the first identifier and the user profile information contains user-specific session management policies. The fourth method includes determining an AAA server address from the retrieved user profile information. The fourth method includes sending a third request to the determined AAA server wherein the request includes the second identifier. The fourth method includes establishing a user plane for the data connection based on the user profile information identified by the first identifier.

Disclosed herein is a fifth method for accessing a mobile communication network using a User Identifier, according to embodiments of the disclosure. The fifth method may be performed by a PCF, such as the UIMF 149 and/or the network equipment apparatus 600. The fifth method includes receiving from a first network function (e.g., a SMF) a first request to establish a policy association, the first request being sent in response to a request to establish a data connection for a first user and in response to successful authentication of the first user. Here, the first request includes a first identifier. The fifth method includes sending to a second network function (e.g., a UDR) a second request to retrieve user profile information identified by the first identifier (e.g., a user profile identifier). Here, the second request includes the first identifier and the user profile information contains user-specific Policy information. The fifth method includes determining a set of one or more policy rules derived from user-specific Policy information retrieved by the second network function. The fifth method includes sending the set of policy rules to the first network function, wherein the set of policy rules directs communications of the requested data connection.

Disclosed herein is a sixth method for accessing a mobile communication network using a User Identifier, according to embodiments of the disclosure. The sixth method may be performed by network functions in a mobile communication network, including an AMF, a SMF and a UDR. The sixth method includes receiving (by the AMF and from UE) a first request to establish a data connection, wherein the first request includes a first identifier identifying a first user (e.g., User Identifier or User Reference ID) and user credentials to authenticate the first request. The sixth method includes retrieving (by the AMF and from the UDR) subscription information based on PLMN subscription of the first device. The sixth method includes determining (by the AMF) from the retrieved subscription information user profile information identified by a second identifier (e.g., user profile identifier) based on the first identifier, the user profile information containing user-specific access and mobility policies. The sixth method includes determining whether the data connection is permitted based on the user profile information. The sixth method includes sending a second request to the SMF to establish a session management connection wherein the second request includes the second identifier, wherein the SMF authenticates the first user and establishes a user plane for the first data connection based on the user profile information identified by the second identifier.

In certain embodiments, determining whether the data connection is permitted based on the user profile information comprises the AMF determining if the first user identifier is authorized to use the first device based on the user profile information. In certain embodiments, determining whether the data connection is permitted based on the user profile information comprises the AMF determining whether a network identifier included in the first request is authorized to be used by the first user identified by the first identifier based on the user profile information, the network identifier comprising a DNN and/or S-NSSAI.

In some embodiments, the method further comprises the SMF retrieving from the UDR user profile information based on the second identifier, the user profile information containing user-specific Session Management policies.

In certain embodiments, authenticating the first user may include the SMF: determining from the user profile information if the first request requires user authentication by an authentication function responsible for user authentication (e.g., AAA server); and sending a third request to the authentication function to authorize the first request, wherein the third request includes user credentials provided in the first request (user id in SM PDU DN Request container).

In certain embodiments, establishing the user plane for the first data connection includes the SMF: sending a fourth request to a policy control function ("PCF") to establish a policy association in response to successful authentication of the first user, wherein the fourth request includes the second identifier; and receiving a set of one or more policy rules derived from user-specific profile information retrieved by the PCF, wherein the PCF retrieves the user-specific profile information from the second network function (e.g., UDR) based on the second identifier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   establishing a first connection with a remote unit, the first connection associated with a subscription in a mobile communication network;
   receiving a first request via the first connection to create a User Profile;
   determining whether the User Profile is to be linked with a third-party account;
   creating the User Profile based on information in the third-party account in response to determining that the User Profile is to be linked with a third-party account, the information in the third-party account including at least one of a User Identifier, user preferences, authentication method and subscription type;
   creating the User Profile based on information received from a first device in response to determining that the User Profile is not to be linked with a third-party account, the information received from the first device indicating a selection from pre-defined profiles;
   sending to the remote unit via the first connection a Device User Profile, the Device User Profile containing data from the User Profile; and
   sending a second request to the mobile communication network to store the User Profile.

2. The method of claim 1, wherein establishing the first connection comprises:
   authenticating the remote unit using credentials associated with the subscription in the mobile communication network; and
   associating the first connection with the subscription in response to successful authentication.

3. The method of claim 1, wherein determining whether the User Profile is to be linked with a third-party account comprises determining whether the first request contains an indication that the User Profile is linked with a user account associated to a third-party.

4. The method of claim 1, wherein creating the User Profile based on information in the third-party account comprises receiving an access token that provides access to data in the third-party account.

5. The method of claim 1, further comprising creating the User Profile based on a set of credentials included in the first request in response to determining that the User Profile is not to be linked with a third-party account.

6. The method of claim 1, further comprising sending the Device User Profile to one or more additional remote units associated with the subscription.

7. The method of claim 1, where the created User Profile includes additional subscription information for a user, the User Profile including an identifier identifying the User Profile, one or more user identifiers that the User Profile is applicable, a list of one or more device identifiers that the User Profile is allowed to be applied, and a list of one or more network configuration identifiers that a user is permitted to access.

8. The method of claim 1, where the created User Profile includes additional subscription information for a user, the User Profile including an identifier identifying the User Profile, and a list of one or more network configuration policies for each network slice a user is permitted to access.

9. The method of claim 1, where the created User Profile includes additional policy information, the User Profile including an identifier identifying the User Profile and a list of one or more Quality of Service policies for each service and network slice a user is permitted to access.

10. The method of claim 1, wherein the mobile communication network sends a third request to a first network function containing mobile subscription information, wherein the third request includes User Profile information containing one or more of user specific access and mobility subscription information, user specific session management subscription information and user specific policy subscription information.

11. A user identity management apparatus comprising:
a processor that establishes a first connection with a remote unit, the first connection associated with a subscription in a mobile communication network; and
a transceiver that receives a first request via the first connection to create a User Profile;
wherein the processor further:
determines whether the User Profile is to be linked with a third-party account;
creates the User Profile based on information in the third-party account in response to determining that the User Profile is to be linked with a third-party account, the information in the third-party account including at least one of a User Identifier, user preferences, authentication method and subscription type; and
creates the User Profile based on information received from a first device in response to determining that the User Profile is not to be linked with a third-party account, the information received from the first device indicating a selection from pre-defined profiles;
wherein the transceiver further: sends to the remote unit via the first connection a Device User Profile, the Device User Profile containing data from the User Profile; and
sends a second request to the mobile communication network to store the User Profile.

12. The user identity management apparatus of claim 11, wherein establishing the first connection comprises:
authenticating the remote unit using credentials associated with the subscription in the mobile communication network; and
associating the first connection with the subscription in response to successful authentication.

13. The user identity management apparatus of claim 11, wherein determining whether the User Profile is to be linked with a third-party account comprises determining whether the first request contains an indication that the User Profile is linked with a user account associated to a third-party.

14. The user identity management apparatus of claim 11, wherein creating the User Profile based on information in the third-party account comprises receiving an access token that provides access to data in the third-party account.

15. The user identity management apparatus of claim 11, wherein the processor creates the User Profile based on a set of credentials included in the first request in response to determining that the User Profile is not to be linked with a third-party account.

16. The user identity management apparatus of claim 11, wherein the transceiver sends the Device User Profile to one or more additional remote units associated with the subscription.

17. The user identity management apparatus of claim 11, where the created User Profile includes additional subscription information for a user, the User Profile including an identifier identifying the User Profile, one or more user identifiers that the User Profile is applicable, a list of one or more device identifiers that the User Profile is allowed to be applied, and a list of one or more network configuration identifier that the user is permitted to access.

18. The user identity management apparatus of claim 11, where the created User Profile includes additional subscription information for a user the User Profile including an identifier identifying the User Profile, and a list of one or more network configuration policies for each network slice the user is permitted to access.

19. The user identity management apparatus of claim 11, where the created User Profile includes additional policy information, the User Profile including an identifier identifying the User Profile and a list of one or more quality of Service policies for each service and network slice a user is permitted to access.

20. The user identity management apparatus of claim 11, wherein the mobile communication network sends a third request to a first network function containing mobile subscription information, wherein the third request includes User Profile information containing one or more of user specific access and mobility subscription information, user specific session management subscription information and user specific policy subscription information.

* * * * *